(12) United States Patent
Lapp

(10) Patent No.: US 7,302,151 B2
(45) Date of Patent: Nov. 27, 2007

(54) DEVICE FOR THE STRUCTURED STORAGE OR HANDLING OF OPTICAL WAVEGUIDES

(75) Inventor: Oliver Lapp, Wuppertal (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/536,790

(22) PCT Filed: Nov. 14, 2003

(86) PCT No.: PCT/EP03/12759

§ 371 (c)(1),
(2), (4) Date: May 26, 2005

(87) PCT Pub. No.: WO2004/051337

PCT Pub. Date: Jun. 17, 2004

(65) Prior Publication Data

US 2006/0029351 A1 Feb. 9, 2006

(30) Foreign Application Priority Data

Nov. 26, 2002 (DE) ................................ 102 55 291
Mar. 29, 2003 (DE) ................................ 103 14 262

(51) Int. Cl.
*G02B 6/00* (2006.01)

(52) U.S. Cl. ...................... 385/135; 385/134; 385/136; 385/137

(58) Field of Classification Search ................ 385/135, 385/136, 137
See application file for complete search history.

(56) References Cited

U.S. PATENT DOCUMENTS

| | | | |
|---|---|---|---|
| 5,457,763 A | 10/1995 | Kerry et al. ................ | 385/135 |
| 5,751,882 A | 5/1998 | Daems et al. ............... | 385/135 |
| 5,825,964 A * | 10/1998 | Goetter et al. .............. | 385/135 |
| 6,009,225 A | 12/1999 | Ray et al. .................... | 385/135 |
| 6,304,707 B1 | 10/2001 | Daems et al. ............... | 385/135 |
| 6,418,265 B1 | 7/2002 | Engberg et al. ............. | 385/135 |
| 6,650,811 B1 | 11/2003 | Frohlich et al. ............ | 385/100 |

FOREIGN PATENT DOCUMENTS

| | | |
|---|---|---|
| EP | 1095303 B1 | 9/2002 |
| JP | 11202136 A | 7/1999 |
| WO | 90/15351 | 12/1990 |
| WO | 00/65397 | 11/2000 |

* cited by examiner

Primary Examiner—Jennifer Doan
(74) Attorney, Agent, or Firm—Keith A. Roberson

(57) ABSTRACT

A device for storing and handling optical fibers, namely a cable sleeve, includes a frame and a plurality of splice cases arranged one above the other on a front side of the frame and on a rear side of the frame and pivotally fastened to the frame. Fiber guide elements are mounted on at least one narrow side of the frame for guiding optical fibers laterally next to the splice cases. A drawer disposed between the splice cases and configured to be drawn out from a vertically running narrow side of the frame stores uncut multifiber buffer tubes containing optical fibers. Guide channels are disposed inside the splice cases such that the optical fibers are guided within the splice cases in a circular manner with approximately the same radii, irrespective of their individual lenths.

14 Claims, 27 Drawing Sheets

DEVICE FOR THE STRUCTURED STORAGE OR HANDLING OF OPTICAL WAVEGUIDES

This National stage application claims the benefit of International Application No. PCT/EP2003/12759, filed on Nov. 14, 2003, which claims the benefit of German Patent Application No. 10255291.6, filed on Nov. 26, 2002 and German patent Application No. 10314262.2. The International (PCT) Application was not published in the English language under PCT Article 21(2).

FIELD OF THE INVENTION

The invention relates to a device for the structured storage or handling of optical waveguides, especially spliced optical-fiber connections.

BACKGROUND OF THE INVENTION

A device for the structured storage or handling of optical waveguides or of spliced optical-fiber connections, to be specific cable sleeves, is used in fiber-optic cable networks for protecting spliced connections at connecting points of two fiber-optic cables and also for protecting the optical waveguides or optical fibers at branching points or dividing points of fiber-optic cables. In these cases, the cable sleeves must ensure the continuity of the fiber-optic cables as though the fiber-optic cables were not interrupted. The structured storage and careful handling of the optical fibers or of the spliced optical-fiber connections is of decisive significance here, in order that the transmission properties of the optical fibers are not adversely affected.

A large number of cable sleeves are known from the prior art. Reference can be made for example to EP 1 095 303 B1 as prior art. In this document, a device formed as a hood-type sleeve is known for the structured storage or handling of optical waveguides, to be specific of spliced optical-fiber connections.

SUMMARY OF THE INVENTION

Against this background, the present invention is based on the problem of providing a novel device for the structured storage or handling of optical waveguides, especially of spliced optical-fiber connections.

This problem is solved a device for the structured storage or handling of optical waveguides, especially of spliced optical-fiber connections, in which fiber guiding elements for optical fibers are fastened at least to one vertically running narrow side of the frame in such a way that the optical fibers are guided laterally next to the splice cases or laterally next to the frame in the region of the or each narrow side.

Preferably, the fiber guiding elements arranged in the region of the or each narrow side form at least two vertically running guiding channels for optical fibers, a first guiding channel being assigned to the front side of the frame and a second guiding channel being assigned to the rear side of the frame. Each of the guiding channels is subdivided into two guiding channel compartments in each case in such a way that at least two vertically running guiding channel compartments respectively extend in the region of the front side of the frame and in the region of the rear side of the frame, to be specific in each case at least one inner guiding channel compartment and at least one outer guiding channel compartment. This makes particularly structured handling of the optical fibers possible.

According to an advantageous development of this first aspect of the invention concerned here, the two guiding channels running in the region of the or each narrow side are spatially separated from one another by at least one vertically running separating wall, the separating wall having an aperture in a lower portion, so that the optical fibers can be diverted from the first guiding channel into the second guiding channel, and consequently from the front side to the rear side of the frame.

The guiding channel compartments running in the region of the front side and in the region of the rear side of the frame, that is the inner guiding channel compartment and the outer guiding channel compartment, are separated from one another by a number of separating webs spaced apart from one another, an aperture respectively being formed between two neighboring separating webs in such a way that the optical fibers in the region of the front side and in the region of the rear side of the frame can be diverted from the respective inner guiding channel compartment into the respective outer guiding channel compartment.

According to a second aspect of the invention concerned here, a device for the structured storage or handling of optical waveguides, especially of spliced optical-fiber connections, is provided in which a drawer that is guided in the frame can be pulled out in the horizontal direction from a first vertically running narrow side of the frame, the drawer being arranged in the pushed-in position between the splice cases assigned to the front side and the splice cases assigned to the rear side of the frame, and the drawer serving for the storage of uncut multifiber buffer tubes of optical fibers. This first narrow side lies opposite a second vertically running narrow side of the frame, to which the fiber guiding elements for the optical fibers are fastened.

According to a third aspect of the invention concerned here, a device for the structured storage of spliced optical-fiber connections is provided in which guiding channels and/or guiding ribs are arranged within the splice cases in such a way that the optical fibers are guided within the splice cases in a circular manner. This makes particularly careful handling of the optical fibers possible in the splice cases.

According to a further aspect of the invention concerned here, a device for the structured storage or handling of optical waveguides, especially of spliced optical-fiber connections, is provided in which The optical fibers are guided by cylindrical axial bodies of the splice cases in such away that a direction of insertion of the optical fibers into a splice case runs approximately parallel to a pivoting axis of the respective splice case, the cylindrical axial body of the respective splice case being radially slit in such a way that the optical fibers can be inserted into the cylindrical axial body in the radial direction through a radial opening.

Additional aspects and alternative embodiments of the invention will be apparent from the appended claims, drawing figures and the description which follows.

BRIEF DESCRIPTION OF THE DRAWINGS

Exemplary embodiments of the invention are explained in more detail on the basis of the drawings, without being restricted to these. In the drawings.

DETAILED DESCRIPTION OF THE INVENTION

With reference to FIGS. 1 to 32, the invention is described in detail below on the basis of a device formed as a hood-type sleeve for the structured storage or handling of optical waveguides, to be specific of spliced optical-fiber connections. FIGS. 1 to 22 relate to a first exemplary embodiment of the invention, FIGS. 23 to 32 relate to a second embodiment of the hood-type sleeve according to the invention. Although the invention can be used especially advantageously in the case of hood-type sleeves, the invention can also be used in the case of other types of sleeve, for example so-called inline sleeves.

Figure 1:
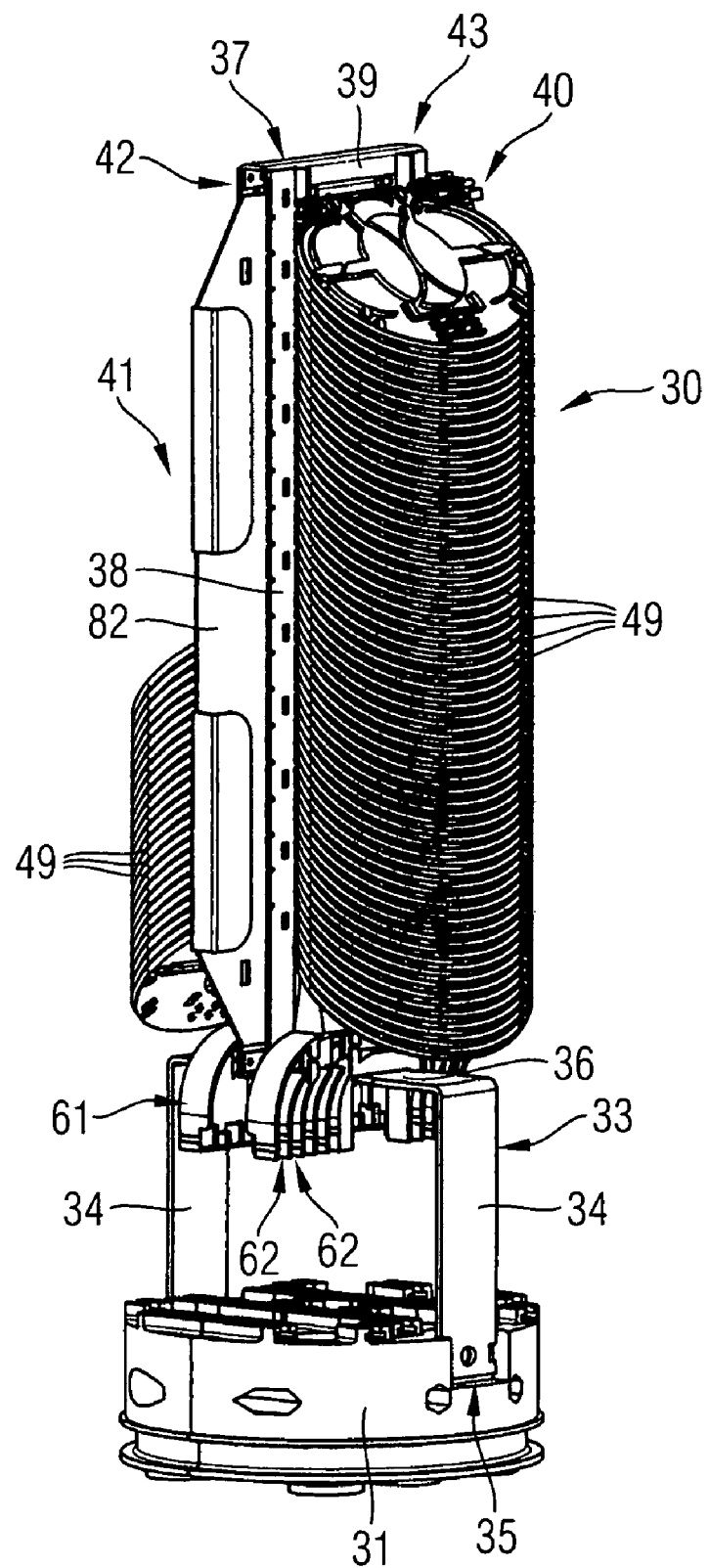
FIG. 1 shows a device according to the invention, formed as a hood-type sleeve, for the structured storage or handling of spliced optical-fiber connections without the covering hood, in a perspective front view, according to a first exemplary embodiment of the invention.

Firstly, the exemplary embodiment according to FIGS. 1 to 22 is described. FIG. 1 shows a hood-type sleeve 30 according to the invention, with the covering sleeve removed. In the case of such a hood-type sleeve 30, fiber-optic cables (not represented) are inserted into the hood-type sleeve 30 from below. The insertion of the fiber-optic cables into the hood-type sleeve 30 takes place via a sealing body 31. Provided in the sealing body 31 are openings 32 (see in particular FIG. 2), through which the fiber-optic cables to be spliced to one another are inserted into the hood-type sleeve 30. The openings 32 for inserting the fiber-optic cables into the hood-type sleeve 30 operate on the principle of glands. The construction and operating principle of such sealing bodies 31 are quite familiar to the skilled person addressed here and therefore need no further explanation.

Fastened to the sealing body 31 is a U-shaped bracket 33. The U-shaped bracket 33 engages with two vertically running legs 34, to be specific with end portions of these legs 34, into lateral recesses 35 of the sealing body 31. The two vertically running legs 34 of the bracket 33 are connected to one another by a horizontally running leg 36. The leg 36 accordingly extends at a vertical distance from the sealing body 31 between the two recesses 35 of the same.

Figure 2:
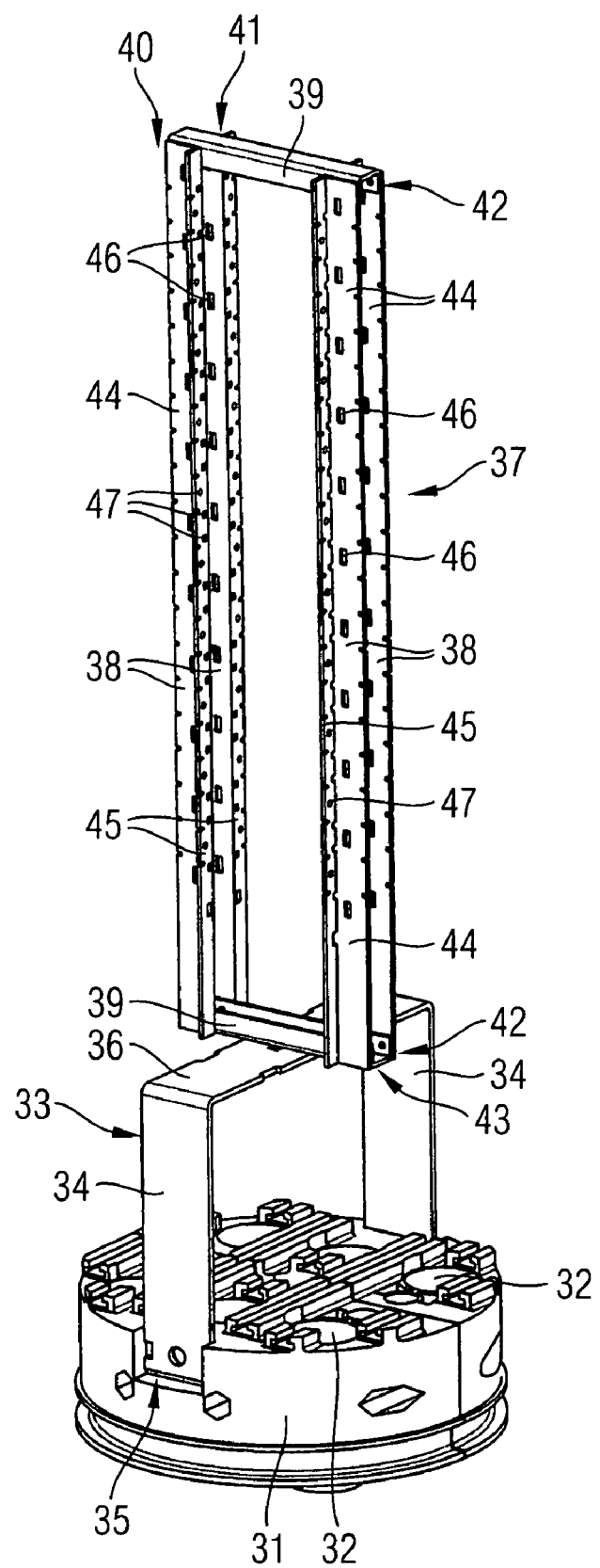
FIG. 2 shows a frame of the hood-type sleeve according to FIG. 1, mounted on a sealing body, in a perspective front view.

Mounted on the horizontally running leg 36 of the bracket 33 is a frame 37 (see in particular FIG. 2). The frame 37 is substantially formed by four vertically running frame parts 38 and two horizontally running frame parts 39. As FIG. 2 reveals, a horizontally running frame part 39 respectively extends at an upper end and at a lower end of the frame 37. To both sides of the horizontally running frame parts 39 there respectively extend two vertically running frame parts 38. The horizontally running frame parts 39 are formed as U-sections and the vertically running frame parts 38 are formed as L-sections. On each side of the horizontally running frame parts 39, one of the vertically running frame parts 38 accordingly acts respectively on the two U-legs running parallel to one another. It follows directly from this that the vertically running frame parts 38 arranged in the region of one side of the horizontally running frame parts 39 are spaced apart from one another. The distance is thereby defined by the width of the horizontally running frame parts 39 formed as U-sections.

A frame 37 formed in this way has a front side 40 and a rear side 41. Both in the region of the front side 40 and in the region of the rear side 41, two vertically running frame parts 38 are respectively arranged, laterally bounding the front side 40 and the rear side 41. Furthermore, the frame 37 has a total of four narrow sides, to be specific two horizontally running narrow sides 42 and two vertically running narrow sides 43.

The horizontally running narrow sides 42 are defined by the horizontally running frame parts 39. The vertically running narrow sides 43, on the other hand, are defined by in each case two neighboring, vertically running frame parts 38, which are fastened to one end of the horizontally running frame parts 39, to be specific to opposite legs of the horizontally running frame parts 39 formed as U-sections.

As already mentioned, the vertically running frame parts 38 are formed as L-sections. With a first leg 44, the vertically running frame parts 38 formed as L-sections are fastened to the horizontally running frame parts 39. Second legs 45 of the vertically running frame parts 38 are angled away from the legs 44 by approximately 90°. As FIG. 2 reveals, openings 46 are provided on the one hand in the first legs 44 and openings 47 are provided on the other hand in the second legs 45.

Figure 3:
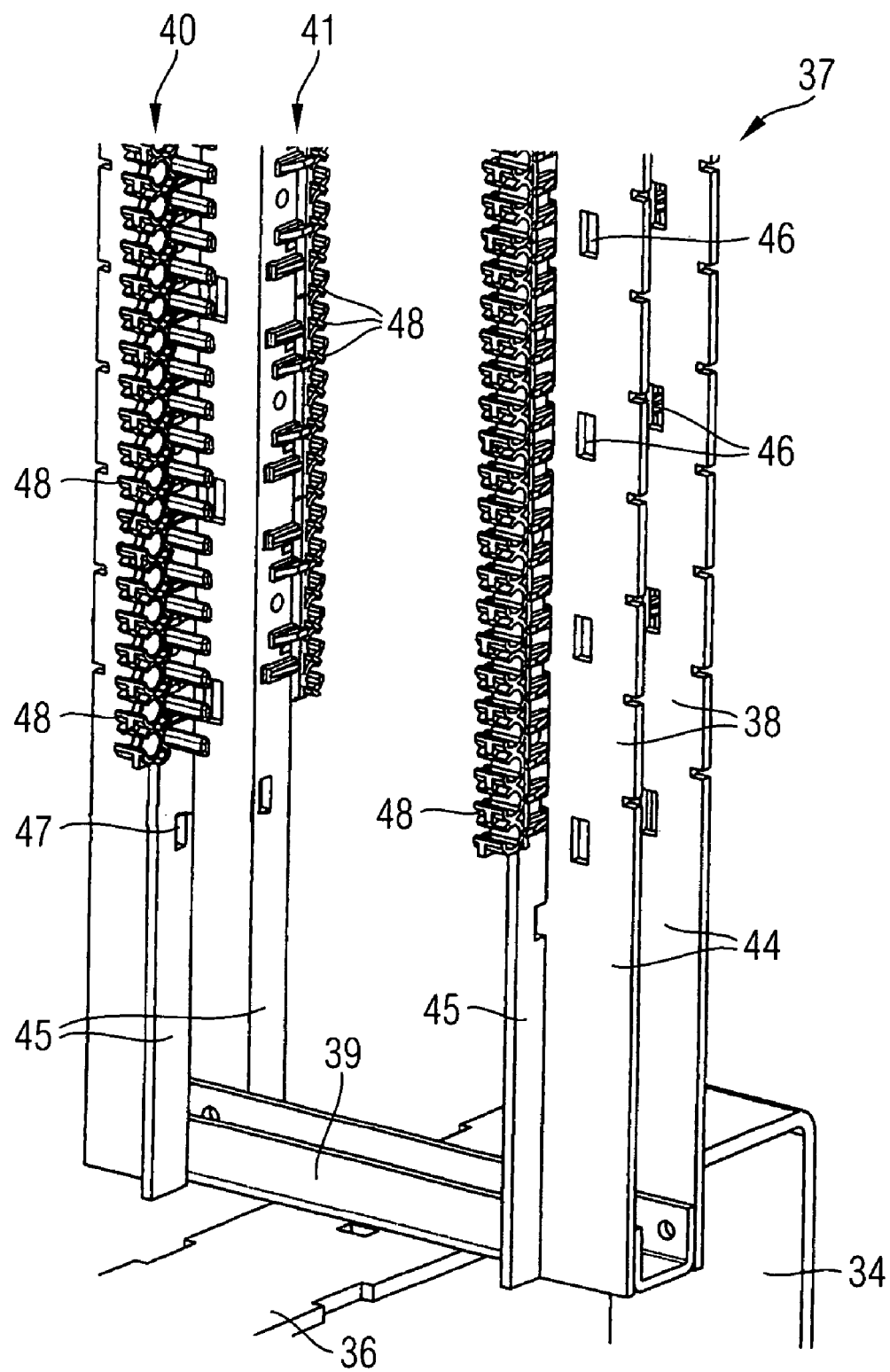
FIG. 3 shows an enlarged detail of the frame of FIG. 1 with holders for splice cases fastened to the frame, in a perspective front view.

According to FIG. 3, guides or holders 48 for splice cases 49 are latched in the openings 47 of the second legs 45 of the vertically running frame parts 38, formed as L-sections. The splice cases 49 are not represented in FIG. 3, but are for example in FIG. 1, 6 or 7. The holders 48 for the splice cases 49 are provided both on the front side 40 and on the rear side 41 of the frame 37. A splice case 49 can be mounted in two holders 48, which lie opposite one another at the same height either on the front side 40 or on the rear side 41 of the frame 37. FIG. 1 in particular therefore reveals that both on the front side 40 and on the rear side 41 of the frame 37 there are accordingly a number of splice cases 49 respectively arranged one above the other. The guides or holders 48 for the splice cases 49 allow pivoting of the splice cases 49 about a pivot axis formed by the respective holders 48. This is revealed in particular by FIG. 6, which shows six swung-down splice cases 49 and a number of swung-up splice cases 49 on the front side 40 of the frame 37. The guides or holders 48 for the splice cases 49 are formed as cylindrical sections.

Figure 4:
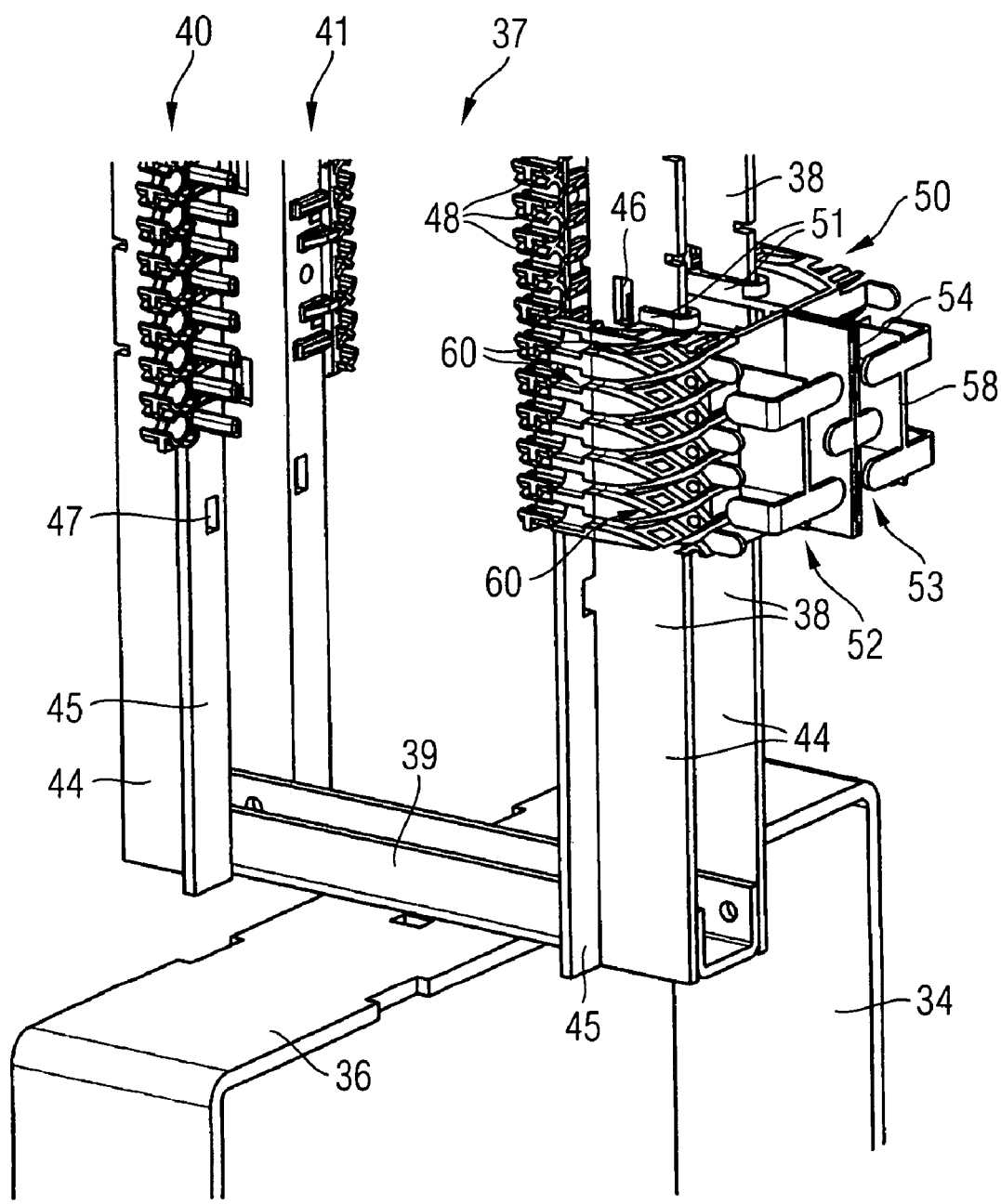
FIG. 4 shows the detail of FIG. 3 with fiber guiding elements additionally mounted on the frame, in a perspective front view.

FIG. 4 shows the frame 37 together with the holders 48 for the splice cases 49 fastened to the frame 37, and with fiber guiding elements 50 additionally fastened to the frame 37. The configuration and arrangement of the fiber guiding elements 50 constitutes a first aspect of the invention concerned here.

FIG. 4 in particular reveals that the fiber guiding elements 50 are assigned to one of the vertically running narrow sides 43 of the frame 37. The fiber guiding elements 50 are pushed onto the legs 44 of the vertically running frame parts 38, formed as L-sections, in the region of this one vertically running narrow side 43, to be specific they are pushed on by means of barb-like anchoring elements 51, which latch into the clearances 46 in the region of the legs 44. The fiber guiding elements 50 are accordingly arranged exclusively in the region of one of the vertically running narrow sides 43 of the frame 37.

As each of FIGS. 4 to 9 reveals, the fiber guiding elements 50 form two vertically running guiding channels 52 and 53. A first guiding channel 52 is assigned to the front side 40 of the frame 37. A second guiding channel 53 is assigned to the rear side 41 of the frame 37. This can be seen best from FIG. 7. The two vertically running guiding channels 52 and 53 are separated from one another by a likewise vertically running separating wall 54. As revealed in particular by FIGS. 5 and 6, the separating wall 54 is provided in a lower portion with an aperture 55. The significance of the aperture 55 is discussed in greater detail further below. Therefore, laterally next to the vertically running narrow side 43 of the frame 37 there extend the two vertically running guiding channels 52 and 53; the first guiding channel 52 is assigned to the front side 40 of the frame 37 and the second guiding channel 53 is assigned to the rear side 41 of the frame 37.

Furthermore, each of FIGS. 4 to 9 reveals that each of the two vertically running guiding channels 52 and 53 is subdivided into two likewise vertically running guiding channel compartments in each case, to be specific an inner guiding channel compartment 56 and an outer guiding channel compartment 57. In the region of the front side 40, to which the first guiding channel 52 is assigned, there accordingly runs an inner guiding channel compartment 56 and an outer guiding channel compartment 57. Likewise, in the region of the rear side 41 there runs an inner guiding channel compartment 56 and an outer guiding channel compartment 57. It follows from this that the separating wall 54 separates the two inner guiding channel compartments 56 from one another. The separation of the inner guiding channel compartments 56 from the outer guiding channel compartments 57 in the region of the front side 40 and in the region of the rear side 41 of the frame 37 takes place by means of separating webs 58. Therefore, a number of such separating webs are positioned over the entire height of the frame 37, apertures 59 being formed respectively between two neighboring separating webs 58. It follows from this that, in the region of the separating wall 54 which separates the two guiding channels 52 and 53 from one another, only one aperture 55 is positioned or provided in a lower portion of the separating wall 54. For the separation of the inner guiding channel compartments 56 from the outer guiding channel compartments 57, however, a number of apertures 59 are provided over the entire height of the frame 37. The significance of the apertures 59 between the separating webs 58 will be discussed in greater detail further below. As revealed in particular by FIG. 7, accordingly four guiding channel compartments 56 and 57, respectively, are positioned in a plane next to one another, to be specific laterally next to the one vertically running narrow side 43 of the frame 37.

The fiber guiding elements 50 form not only the vertically running guiding channels 52, 53, but also curved guiding channels 60 for optical fibers. This can be seen for example in FIG. 4. The curved guiding channels 60 open out on the one hand into the outer guiding channel compartments 57 and on the other hand into the holders 48, formed as cylindrical hollow bodies, for the splice cases 49. The significance of the curved guiding channels 60 will likewise be discussed in greater detail further below.

Figure 5:
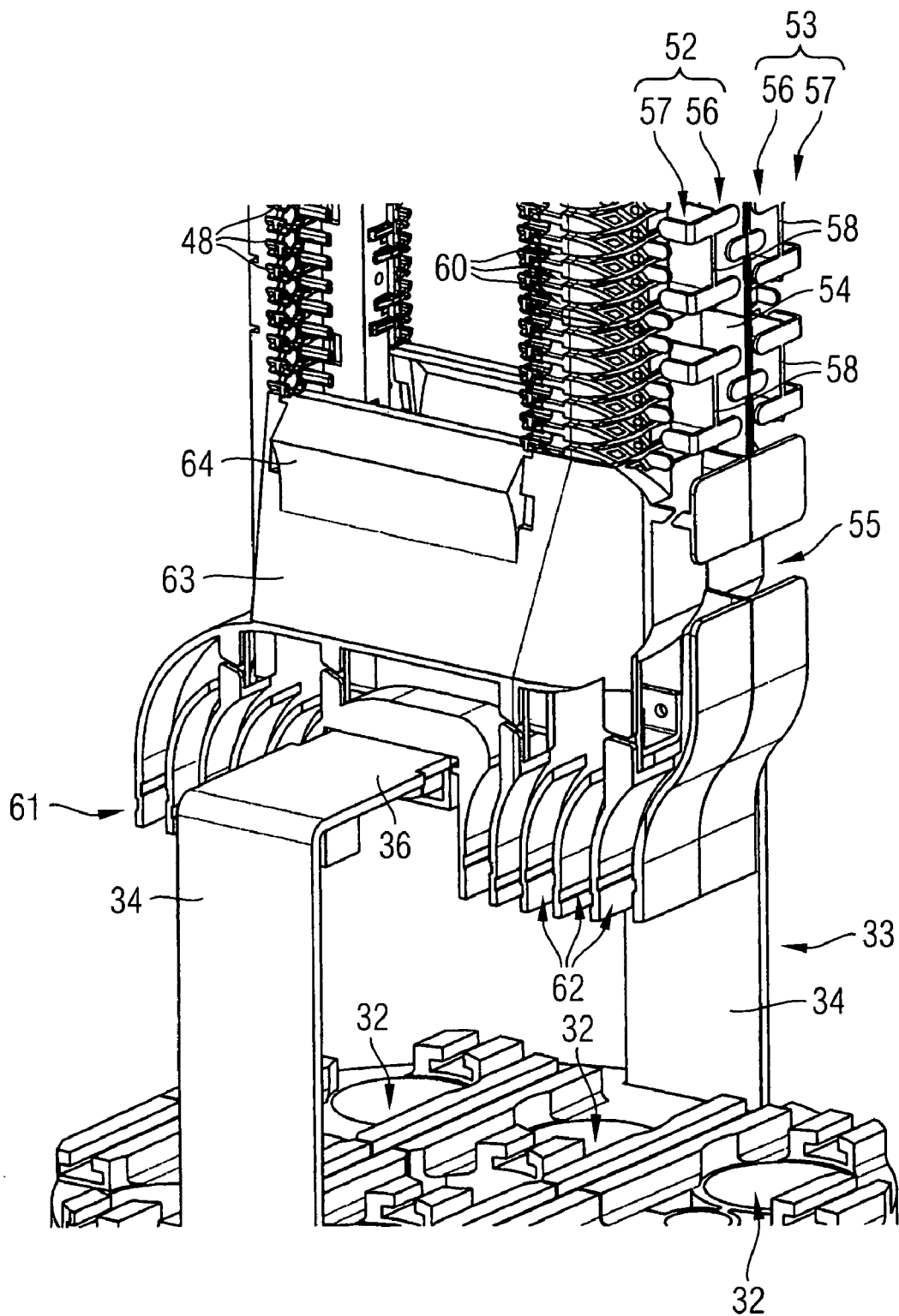
FIG. 5 shows the detail of FIG. 4 with buffer-tube guiding elements additionally mounted on the frame, in a perspective front view.
Figure 6:
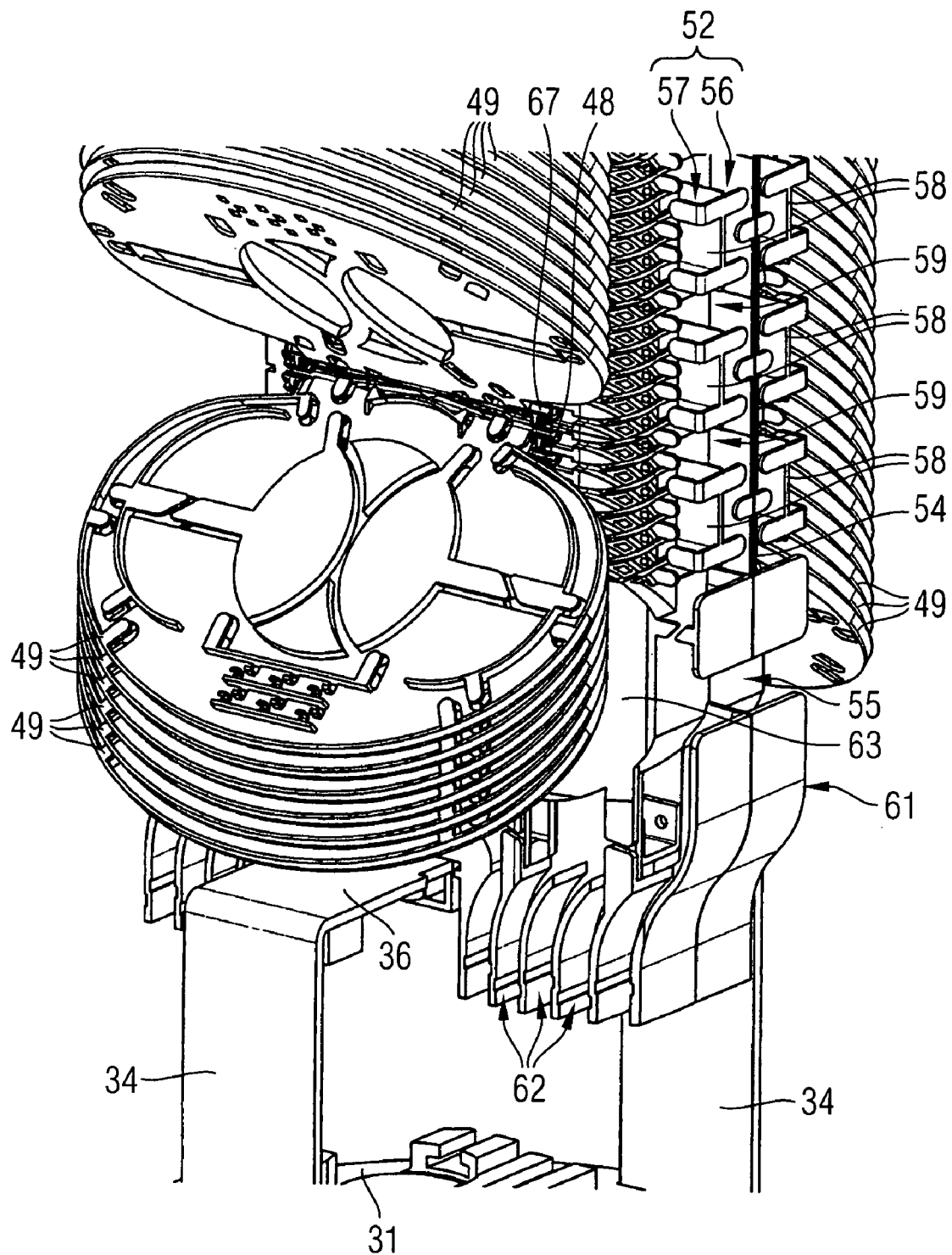
FIG. 6 shows the detail of FIG. 5 with splice cases additionally mounted on the frame, in a perspective front view.

As FIG. 5 in particular reveals, a directing device or fixing device 61 for multifiber buffer tubes is arranged in a lower portion of the frame 37, that is in the region of the bracket 33. This directing device or fixing device 61 for the multifiber buffer tubes has a number of directing channels 62. The directing channels 62 all have a curved profile and end in the region of the vertically running narrow side 43 on which the fiber guiding elements 50 are arranged and on which the vertically running guiding channels 52, 53 are formed. In a lower portion of the guiding channels 62, the same are facing the sealing body 31, and consequently the openings 32 within the sealing body 31. In the case of the exemplary embodiment according to FIGS. 1 to 22, the directing channels 62 accordingly all lie in one plane and end in the region of a vertically running narrow side 43.

Figure 7:
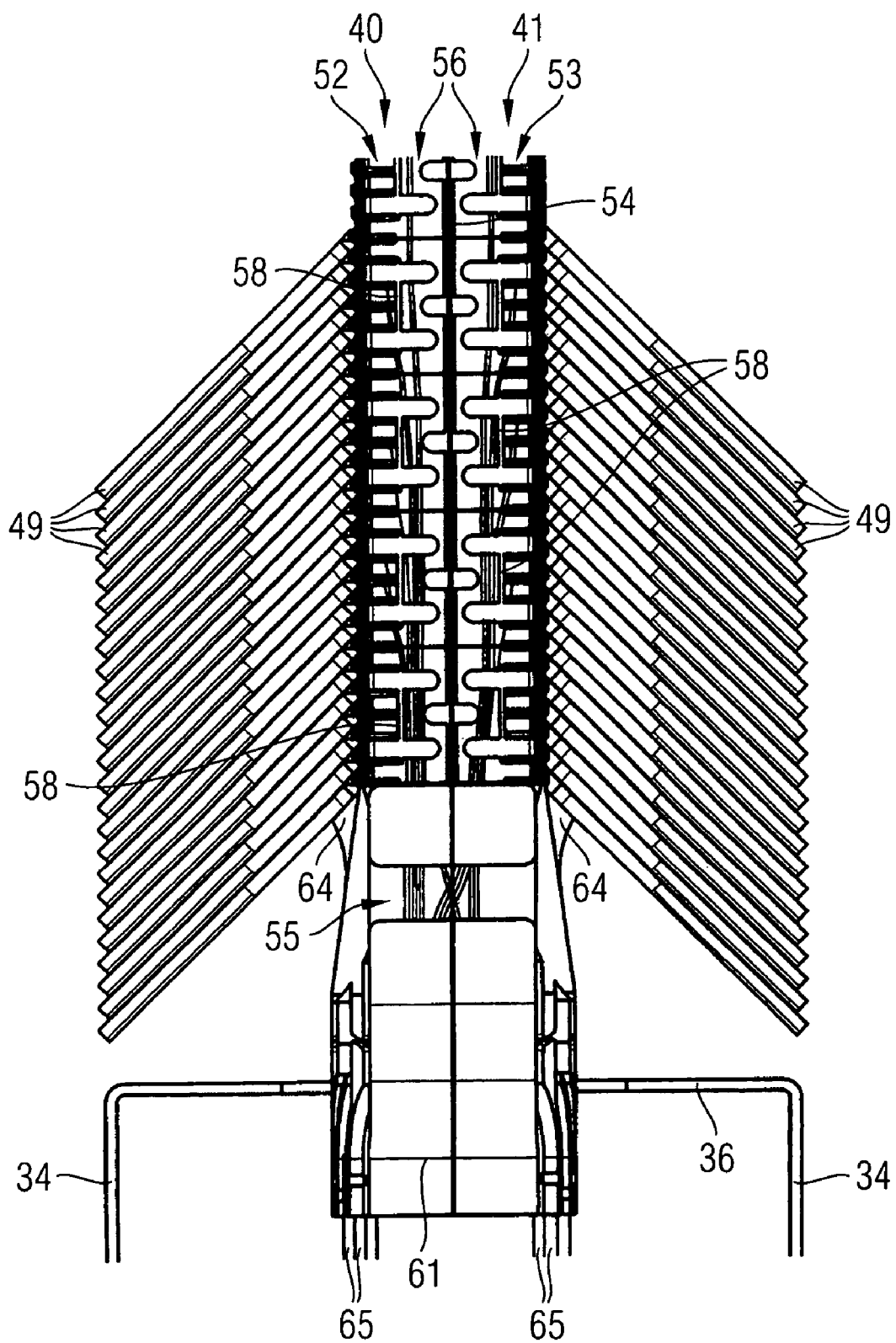
FIG. 7 shows a cutout from the device according to the invention, formed as a hood-type sleeve, for the structured storage of spliced optical-fiber connections according to FIGS. 1 to 6, in a side view.

Positioned above the guiding channels 62 and beneath the lowermost holders 48 for the splice cases 49 is a plate-shaped element 63 with a stop 64 for the lowermost splice case 49. As FIG. 7 in particular reveals, the lowermost splice case 49 rests on the stop 64 in the swung-down or pivoted-down position. As a result, the approximately 45° sloping inclination of the splice cases 49 that is represented in FIG. 7 is obtained in the swung-down position.

Figure 8:
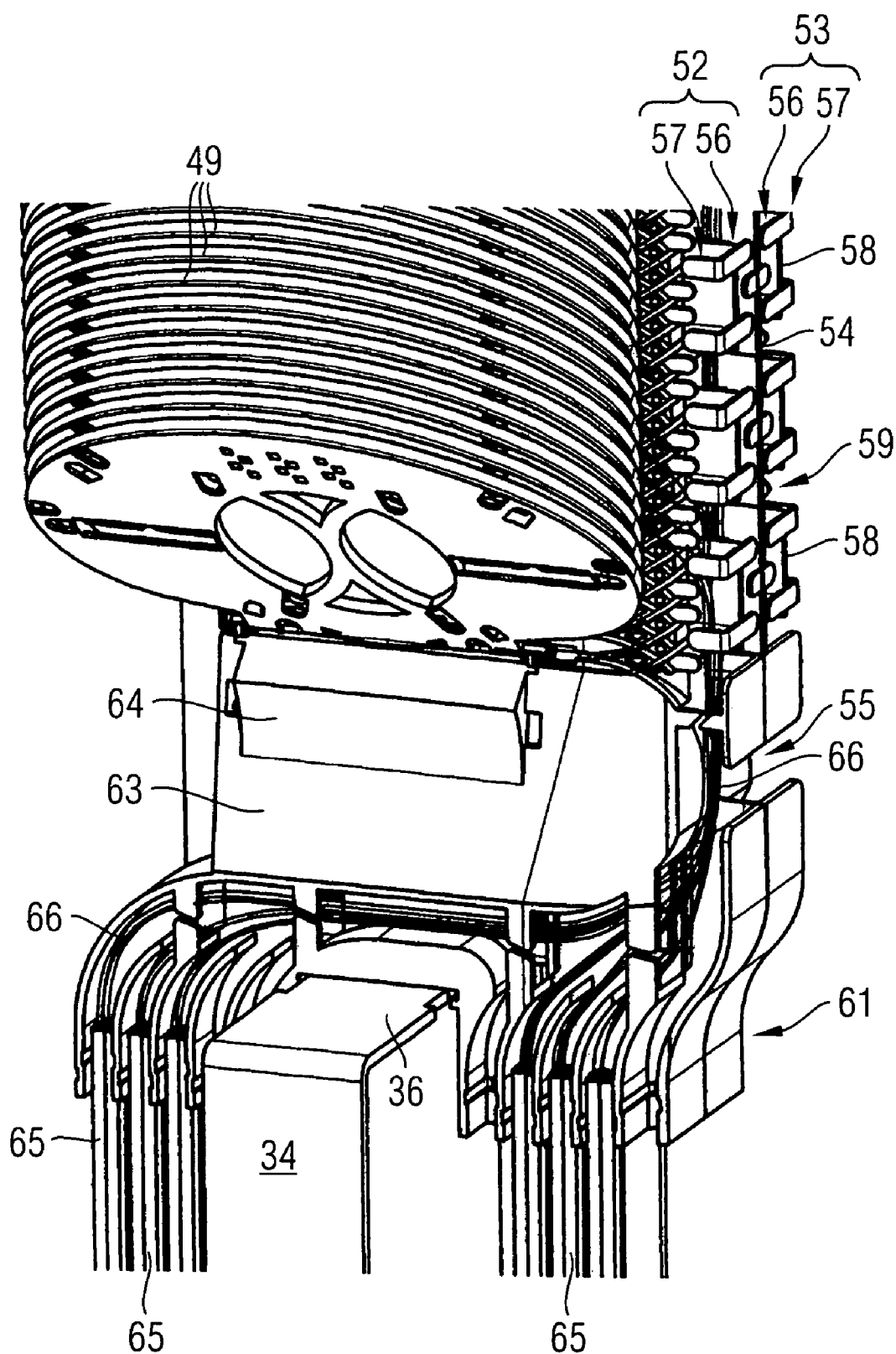
FIG. 8 shows a detail analogous to FIG. 6 together with multifiber buffer tubes and optical fibers guided in the hood-type sleeve, in a perspective front view.
Figure 9:
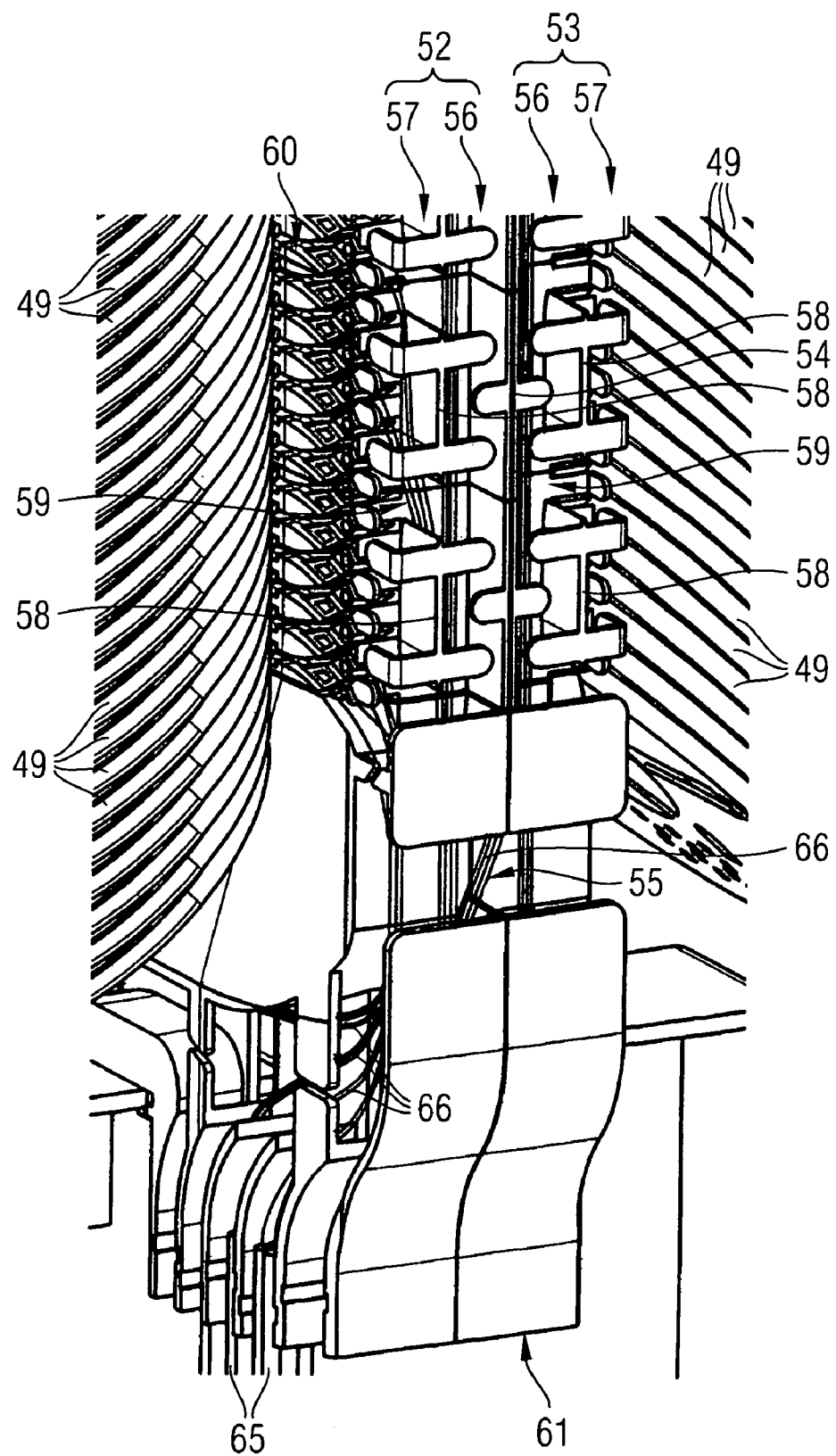
FIG. 9 shows a detail of FIG. 7 in the region of vertical guiding channels for optical fibers, in a perspective side view.

As already mentioned several times, fiber-optic cables to be connected are inserted through the openings 32 of the sealing body 31 into the hood-type sleeve 30. A number of multifiber buffer tubes are positioned in such fiber-optic cables, preferably twelve optical fibers being arranged within one multifiber buffer tube. FIG. 8 shows a number of multifiber buffer tubes 65 with optical fibers 66 arranged in the multifiber buffer tubes 69. The fiber-optic cable as such is not shown in FIG. 8. The multifiber buffer tubes 65 are inserted via the lower portions of the directing channels 62 in approximately parallel alignment in relation to one another into the directing channels 62 of the fixing device 61. As soon as the multifiber buffer tubes 65 have been inserted into the directing channels 62 of the fixing device 61, the multifiber buffer tubes are preferably also fixed to the directing channels 61 by means of cable ties that are not represented. Directly following this, jackets are removed from the multifiber buffer tubes 65 and only the individually separated optical fibers 66 are guided. Therefore, FIG. 8 reveals that all the optical fibers 66 guided in the multifiber buffer tubes 65 are guided via the directing channels 62 into the region of the vertically running narrow side 43 of the frame 37 in which the fiber guiding elements 50 are positioned. The optical fibers 66 are accordingly directed into the region of the vertically running guiding channels 52 and 53 and are accordingly guided exclusively in the region of the vertically running narrow side 43 laterally next to the splice cases 48 in which the fiber guiding elements 50 are positioned.

At the transition of the optical fibers 66 from the fixing device 61 into the fiber guiding elements 50, it must be decided whether an individual optical fiber 66 is fed to a splice case 49 in the region of the front side 40 or in the region of the rear side 41. The aperture 55 in the separating wall 54 is significant in this connection. The aperture 55 accordingly serves for deflecting the optical fibers 66 out of the region of the front side 40 into the region of the rear side 41 or out of the region of the rear side 41 into the region of the front side 40. Directly after the optical fibers 66 have accordingly left the directing channels 62 of the fixing device 61, it is decided whether the optical fibers 66 are fed to the vertically running guiding channel 52 in the region of the front side 40 or to the vertically running guiding channel 53 in the region of the rear side 41. The deflection of optical fibers 66 in the region of the aperture 55 of the separating wall 54 can be clearly seen in particular in FIG. 7.

Once it has been established whether the optical fibers 66 are guided in the guiding channel 52, assigned to the front side 40, or in the guiding channel 53, assigned to the rear side 41, and ultimately are fed to the splice cases 49, all the optical fibers 66 in the region of a guiding channel 52 or 53 are initially guided in the inner guiding channel compartment 56 of the respective guiding channel 52 or 53. The optical fibers 66 are guided in the inner guiding channel compartment 56 until they reach the height at which the splice case 49 to which the corresponding optical fiber 66 is to be fed is positioned. Once the corresponding height has been reached, the corresponding optical fibers 66 are deflected out of the inner guiding channel compartment 56 via the apertures 59 in the region of the separating webs 58 into the outer guiding channel compartment 57. This can be seen particularly clearly in FIGS. 7 and 9 for example. Once the optical fibers 66 have reached the corresponding height of the splice case 49 into which the optical fibers 66 are to be inserted, the optical fibers 66 accordingly run for the first time in the outer guiding channel compartment 57. From the outer guiding channel compartment 57, the optical fibers are then inserted into the curved guiding channel 60, which interacts with the holder 48 of the corresponding splice case 49. This can be seen in detail in particular in FIG. 9 and FIG. 14.

The configuration according to the invention accordingly makes particularly structured and careful storage or handling of optical fibers possible within a cable sleeve. Once they have been individually separated from the multifiber buffer tubes 65 by removing the jacket from the buffer tubes 65, the optical fibers 66 are initially guided into the region of one side of the splice cases 49. The optical fibers 66 are exclusively guided to one side of the splice cases 49 or to one side of the frame 37 in vertically running guiding channels 52 and 53. Directly after all the optical fibers 66 have been guided into the region of this one side, the optical fibers are fed either to a guiding channel 52 assigned to the front side 40 of the frame 37 or to a guiding channel 53 assigned to the rear side 41 of the frame 37 and are guided vertically upward. Within these two guiding channels 52 and 53, the optical fibers 66 run initially in the region of the inner guiding channel compartments 56, until the height of the splice cases 49 into which the respective optical fiber 66 is to be inserted is reached. Once this height is reached, the optical fibers 66 are transferred into the region of the outer guiding channel compartment 57 and then ultimately threaded into the curved guiding channel 60, which feeds the optical fiber 66 to a splice case 49.

The splice cases 49 are clipped into the holders 48 by means of cylindrical axial bodies 67. This is revealed in particular by FIG. 6. The cylindrical axial bodies 67 of the splice cases 49 are represented in greater detail in FIGS. 10 to 12. Furthermore, these details are revealed in FIGS. 17 and 18.

The cylindrical axial bodies 67 of the splice cases 49 are formed as hollow cylinders. The optical fibers 66 are guided through the cylindrical axial bodies 67 for insertion of the same into a splice case 49, to be precise in such a way that a direction of insertion of the optical fibers 66 into a splice case 49 runs approximately parallel to a pivot axis of the respective splice case 49 defined by the axial bodies 67. The guidance of an optical fiber 66 through the cylindrical axial bodies 67 parallel to the pivot axis of the splice case 49 can be seen particularly well in FIG. 18. It is of significance in this connection that the cylindrical axial bodies 67 are axially slit, that is have an opening 68 in the radially outward direction. The opening 68 in the region of the cylindrical axial bodies 67 can be seen for example in FIG. 10. The optical fibers 66 can be inserted in the radial direction into the cylindrical axial bodies 67 via the opening 68. As a result, particularly simple and careful insertion of the optical fibers 66 from the curved guiding channels 60 into the splice case 49 is made possible.

Figure 10:
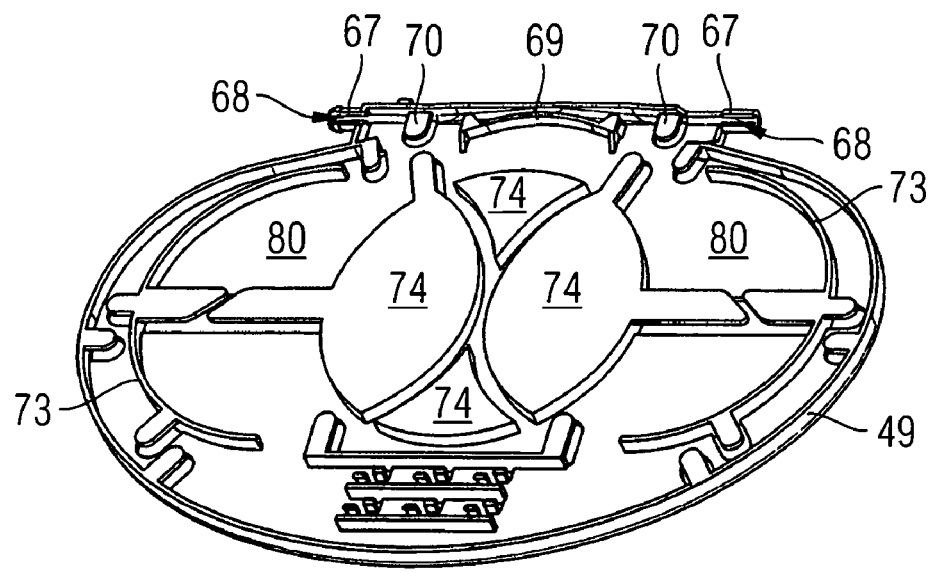
FIG. 10 shows a splice case of the device according to the invention, formed as a hood-type sleeve, for the structured storage of spliced optical-fiber connections according to FIGS. 1 to 9, in a perspective plan view.
Figure 11:
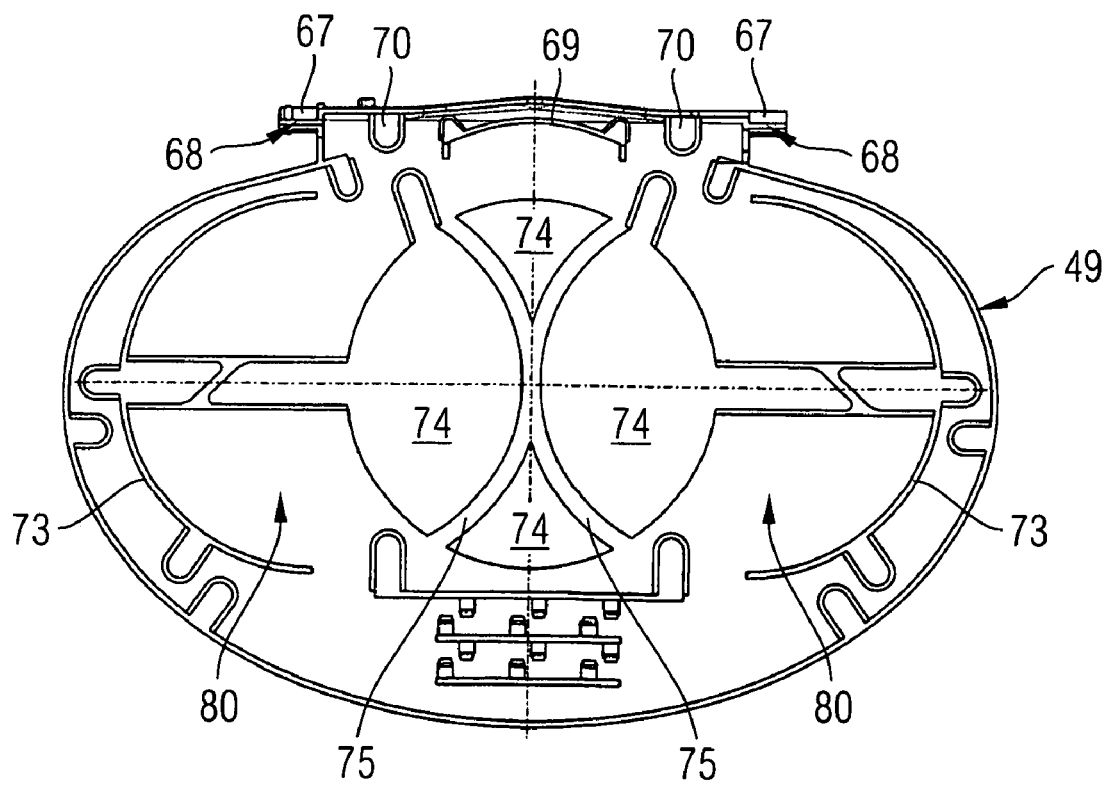
FIG. 11 shows the splice case of FIG. 10 in a plan view.
Figure 20:
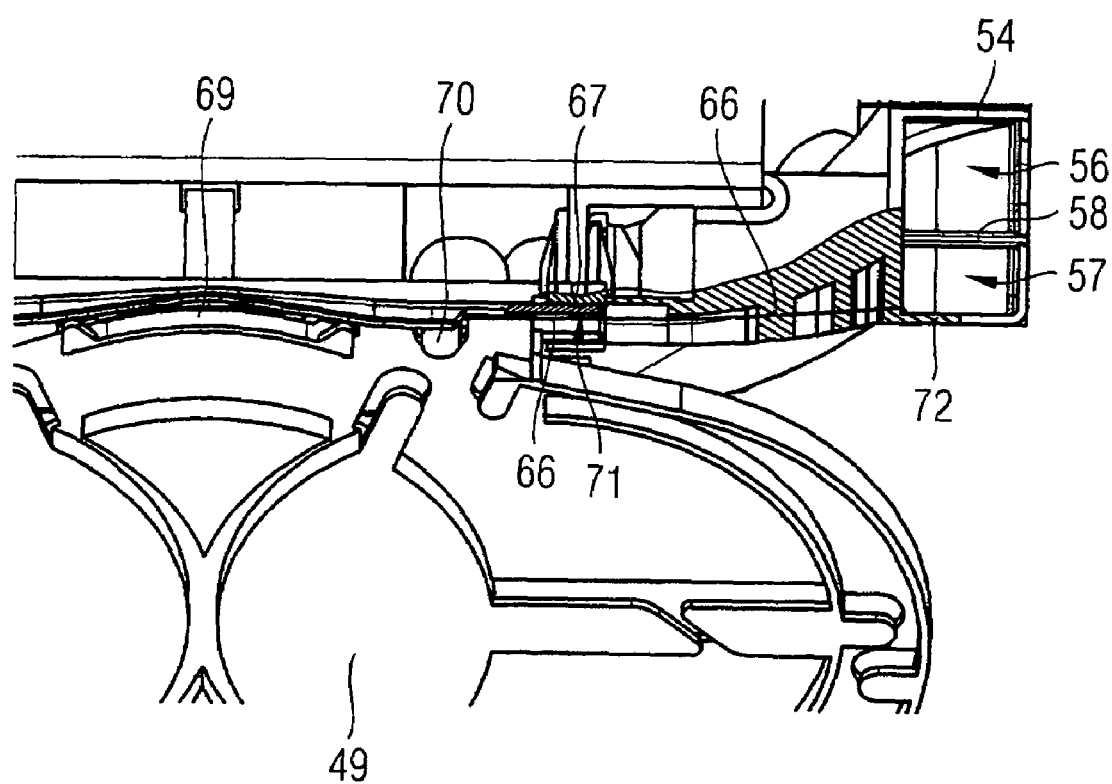
FIG. 20 shows an enlarged cutout from the detail of FIGS. 14 to 16 in a perspective plan view.

In order then to ensure that the optical fibers 66 placed into the cylindrical axial bodies 67 cannot jump out from the cylindrical axial bodies 67, in particular during the pivoting of the splice cases 49, and be damaged thereby, guiding webs 69, 70 are integrated in the splice case 49 (see in particular FIGS. 10 and 11). As revealed in particular by FIG. 19, the guiding webs 69, 70 are integrated in the splice case 49 in such a way that, in projection, one of the guiding webs 69, 70 covers the opening 68 in the axial cylinder 67 in every position of the splice case 49. The optical fibers 66 always lie against an inner wall 71 of the cylindrical axial body 67 lying opposite the opening 68. It is accordingly ensured as a result that the optical fibers 66 always remain inside the axial body 67 during the pivoting of the splice case 49, and cannot jump out from it. Furthermore, laterally next to the curved channels 60 in the region of the outer guiding channel compartments 57 are guiding webs 72, which likewise serve for the guidance of the optical fibers 66 (see in particular FIGS. 14, 15, 16 and 18). The guiding webs 72 in the region of the outer guiding channel compartments 57 prevent the optical fibers from falling out from the outer guiding channel compartments 57. Furthermore, the guiding webs 72 also have the effect in the region of the outer guiding channel compartments 57 that the optical fibers 66 lie against the inner wall 71 of the cylindrical axial body 67. This can be seen in particular in FIG. 20. This is the case because an inner wall of the guiding web 72 is rearwardly or inwardly offset with respect to the inner wall 71 of the cylindrical axial bodies 67, so that the slightly curved or slightly rearwardly or inwardly bent profile of the optical fibers 66 that is represented in FIG. 20 is obtained.

A further aspect of the invention concerned here relates to the guidance of the optical fibers 66 within the splice cases 49. The optical fibers 66 running in the splice cases 49 are therefore curved in a circular manner within the splice cases 49. The circular guidance of the optical fibers 66 has the advantage that the same are subjected to minimized mechanical loading. The transmission properties of the optical fibers 66 are then not adversely influenced.

To ensure the circular guidance of the optical fibers 66 within the splice cases 49, a number of guiding channels or guiding ribs are integrated in the splice cases 49. FIG. 11 therefore shows two outer, semicircular guiding ribs 73 and also guiding ribs 74, which are arranged in a central portion of the splice cases 49 and the outer contour of which likewise defines, at least in certain portions, a segment of a circle. Therefore, in the case of the exemplary embodiment of FIG. 11, a total of four guiding ribs 74 are arranged in the central portion of the splice cases 49. All the outer edges of the guiding ribs 74 define segments of a circle of different sizes. Circular guiding channels 75 are formed between the guiding ribs 74 arranged in the central region of the splice case 49.

Figure 12:
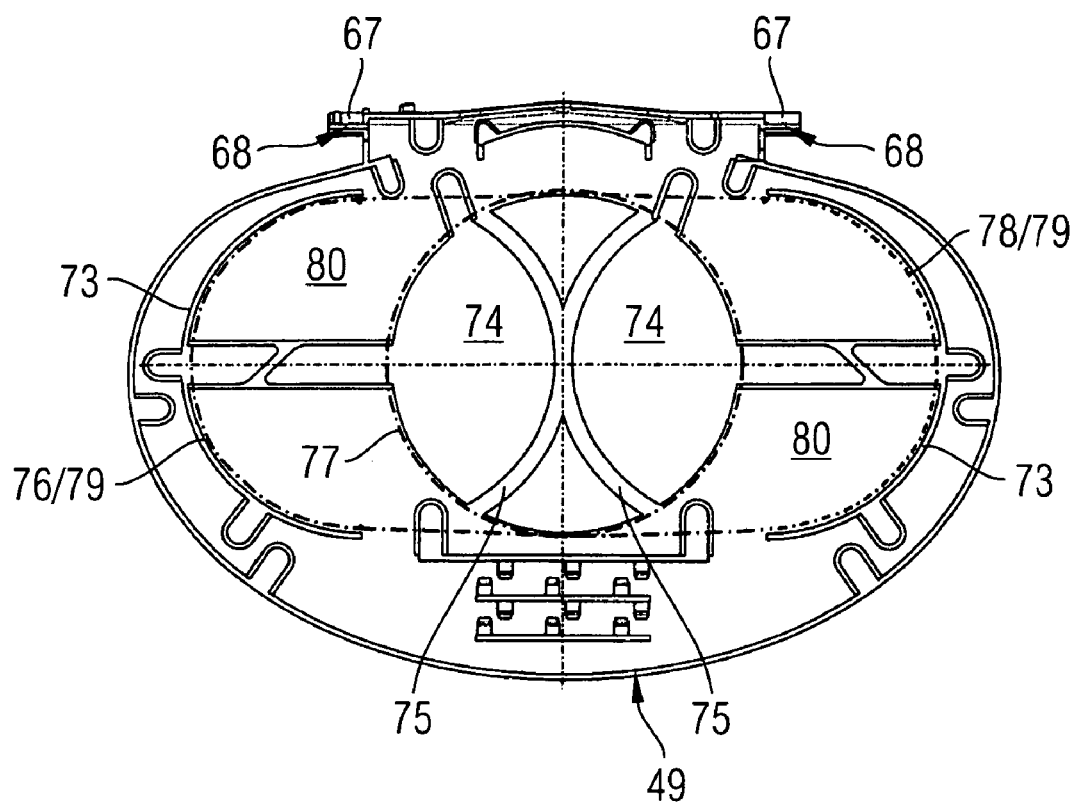
FIG. 12 shows the splice case of FIGS. 10 and 11 in a plan view, with visualization of possible fiber guides within the splice case in plan view.
Figure 13:
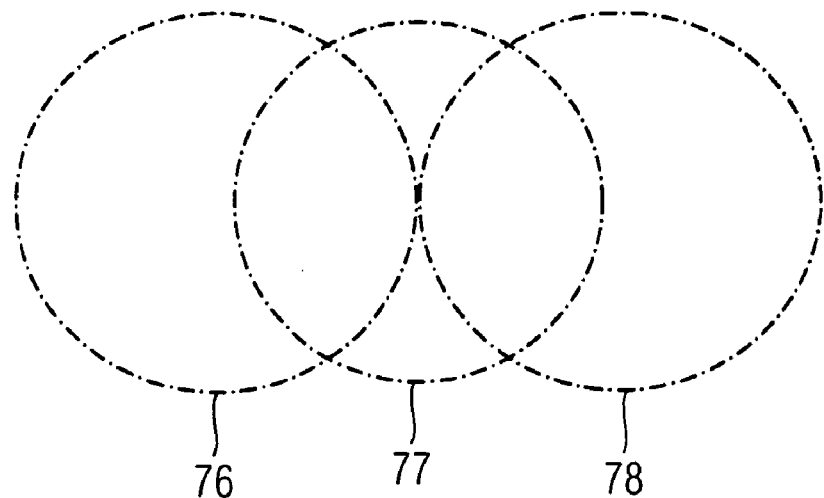
FIG. 13 shows the visualization of possible fiber guides according to FIG. 12 represented on their own.

It can be seen from FIGS. 12 and 13 that the guiding ribs 73 and the guiding ribs 74 form three interlinked and overlapping circular guides 76, 77 and 78. The circular guides 76, 77 and 78 are in this case aligned in relation to one another in such a way that the two outer circular guides 76 and 78 touch in the central portion of the splice cases 49 and merge there tangentially with each other. In this region, a change in the radius of curvature can then be realized for the optical fibers 66. Furthermore, the circular guides 76, 77 and 78 are aligned in relation to one another in such a way that the optical fibers 66 can be guided in a circular manner in the splice case with approximately the same radii, irrespective of their length. This makes it possible to provide circular guidance for any desired length of optical fibers 66 within the splice cases 49, while maintaining the ideal bending radius, and consequently careful handling of the optical fibers 66. FIG. 12 shows for example that, in the sense of a circular guide 79, an oval guidance of the optical waveguides is also possible, the oval circular guide 79 being composed of the circular guides 76 and 78. It is also of significance in this connection that a stowage space 80 for excess lengths of the optical fibers 66 is created between the outer guiding ribs 73 and the inner guiding ribs 74. The actual length compensation for the optical fibers takes place within the stowage space 80, since the oval circular guide 79 may be pronounced to a greater or lesser extent within the stowage space 80.

Figure 14:
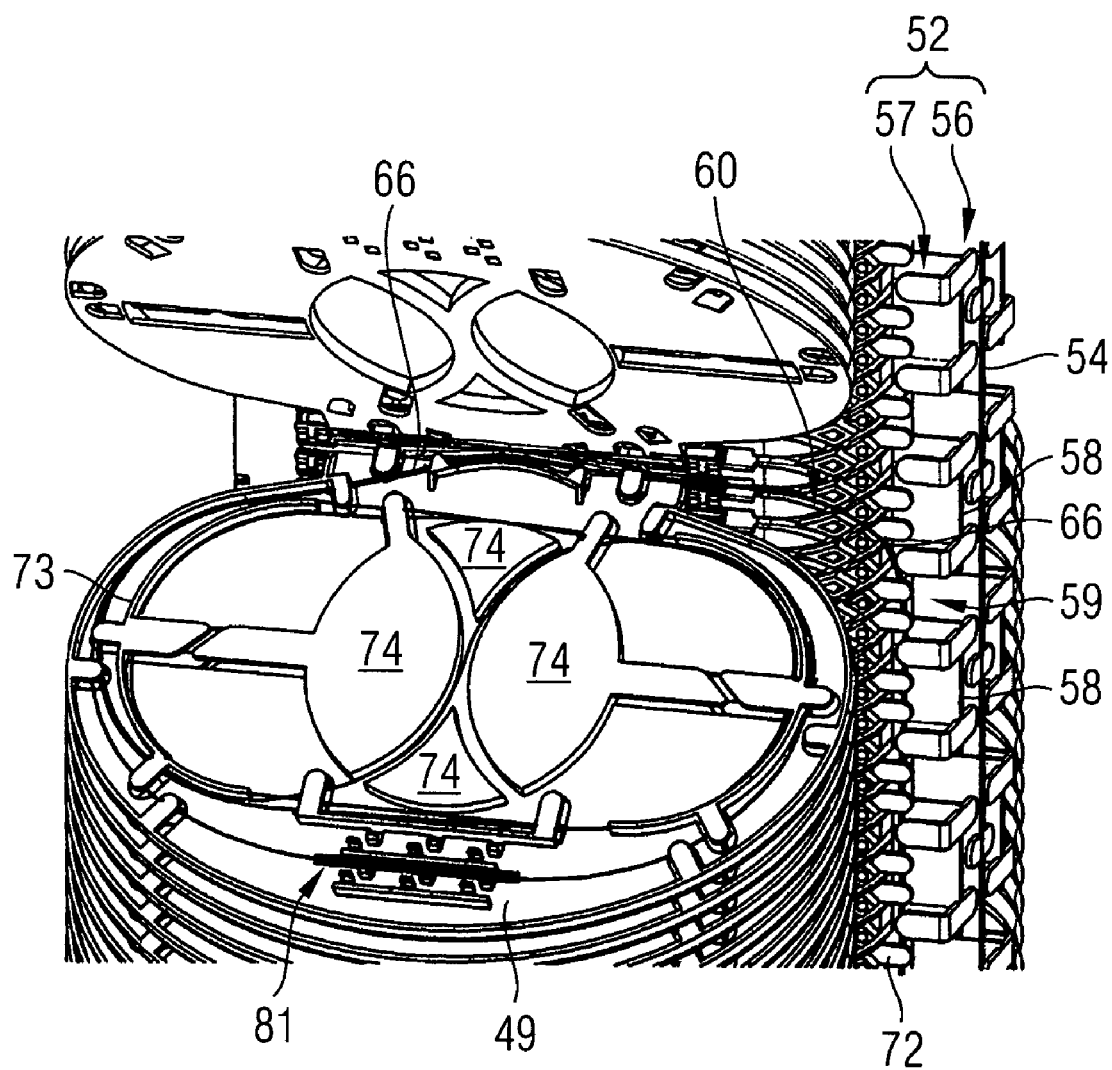
FIG. 14 shows a further detail of the device according to the invention, formed as a hood-type sleeve, for the structured storage of spliced optical-fiber connections according to FIGS. 1 to 13 to illustrate the fiber guide, in a perspective front view.
Figure 15:
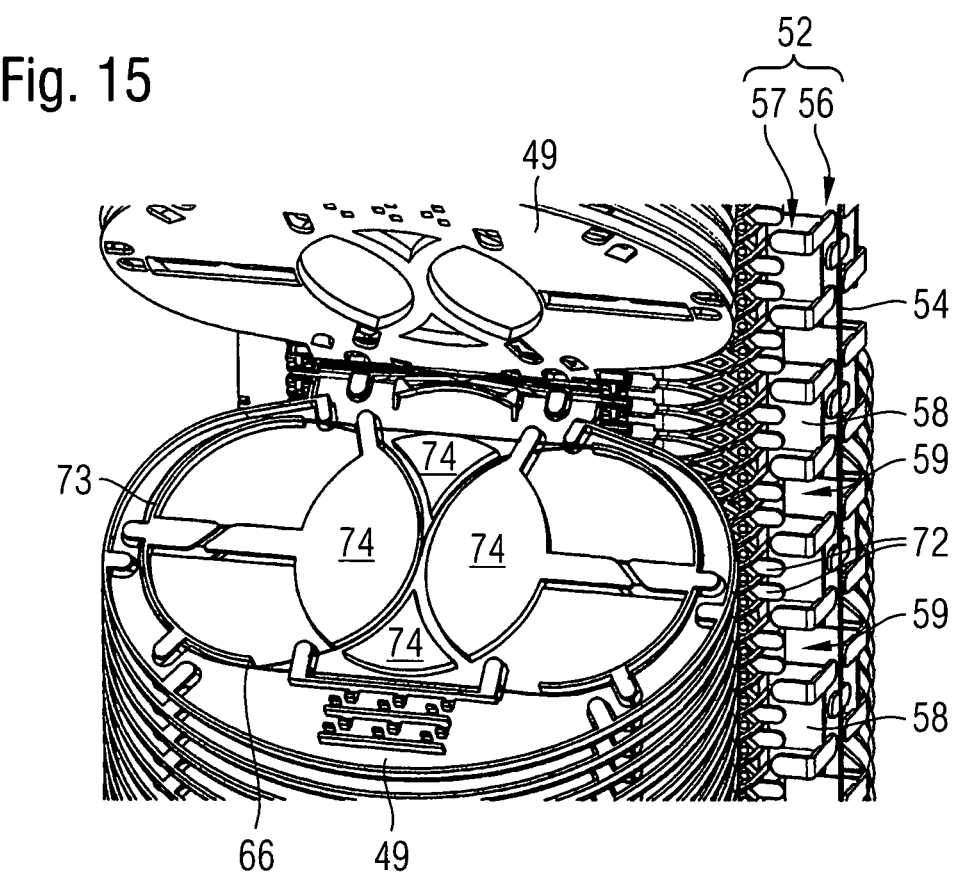
FIG. 15 shows the detail of FIG. 14 with an alternative fiber guide within a splice case, in a perspective front view.
Figure 16:
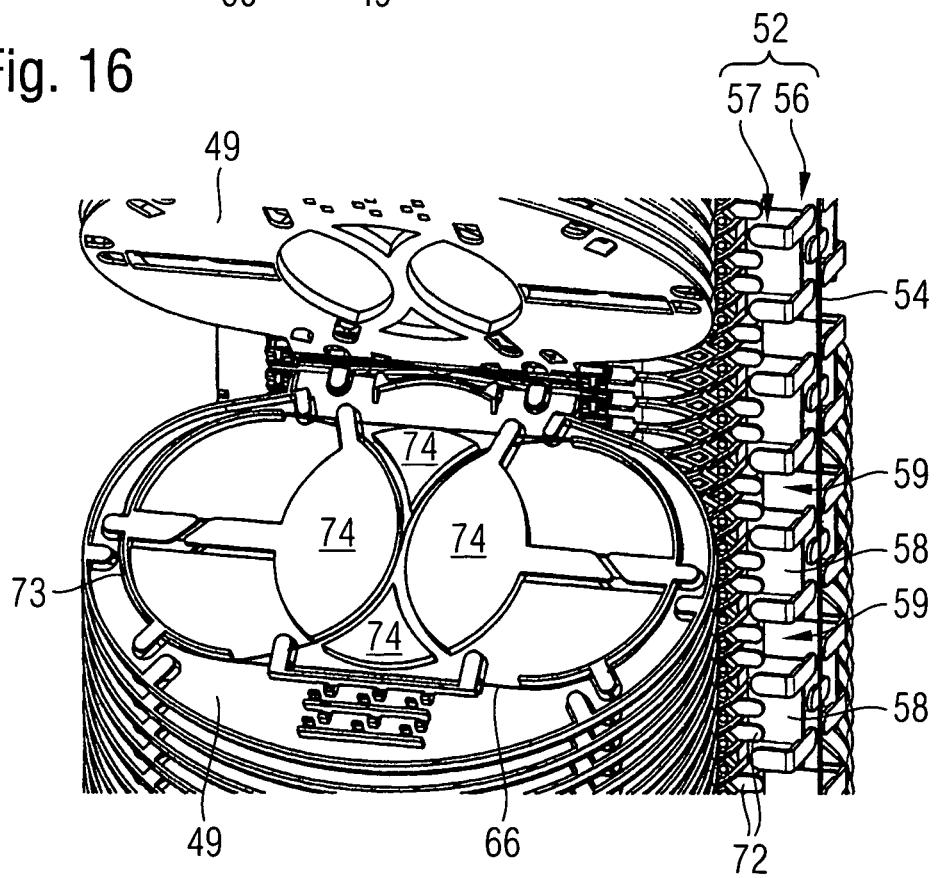
FIG. 16 shows the detail of FIGS. 14 and 15 with an alternative fiber guide within a splice case, in a perspective front view.
Figure 17:
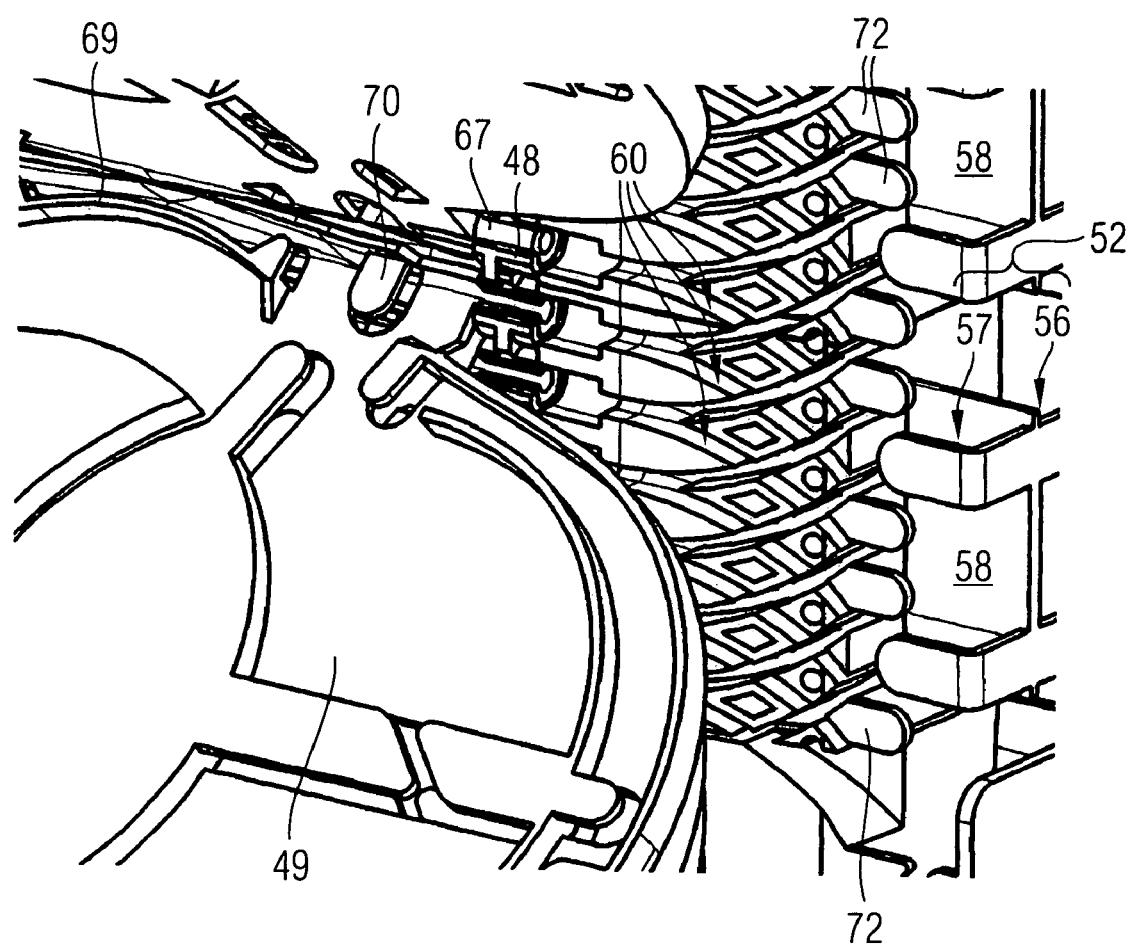
FIG. 17 shows an enlarged cutout from the detail of FIGS. 14 to 16, in a perspective front view.
Figure 18:
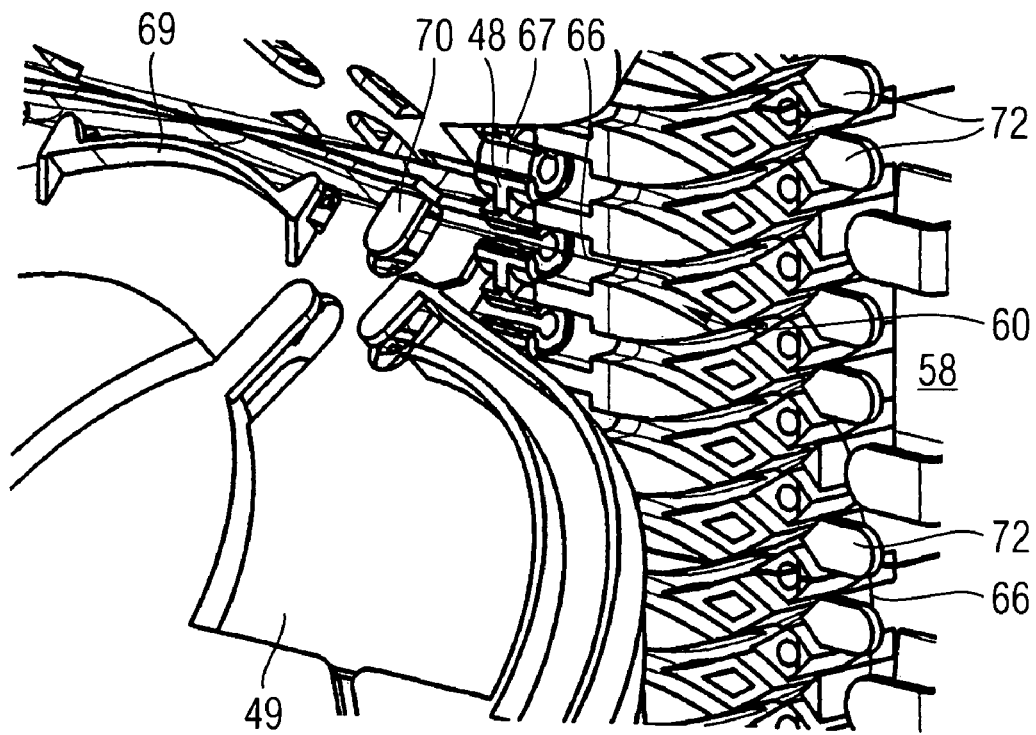
FIG. 18 shows the detail of FIG. 17 with a fiber guide.
Figure 19:
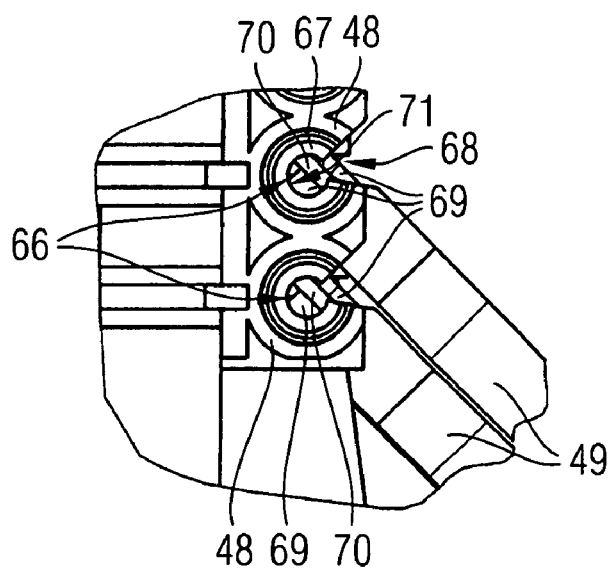
FIG. 19 shows an enlarged cutout from the detail of FIGS. 14 to 16 in a side view.

FIGS. 14 to 16 show optical fibers 66, which are guided in different ways within the splice cases 49. For instance, FIG. 16 shows a number of optical fibers 66 which are guided on the one hand in an oval manner and on the other hand in a circular manner. Furthermore, FIG. 14 shows a splice 81 between two optical fibers 66 to be connected, which is stored in a region of the splice case 49 specifically provided for this purpose. Within such a splice case 49, a total of four such cable splices 81 can be stored.

Figure 21:
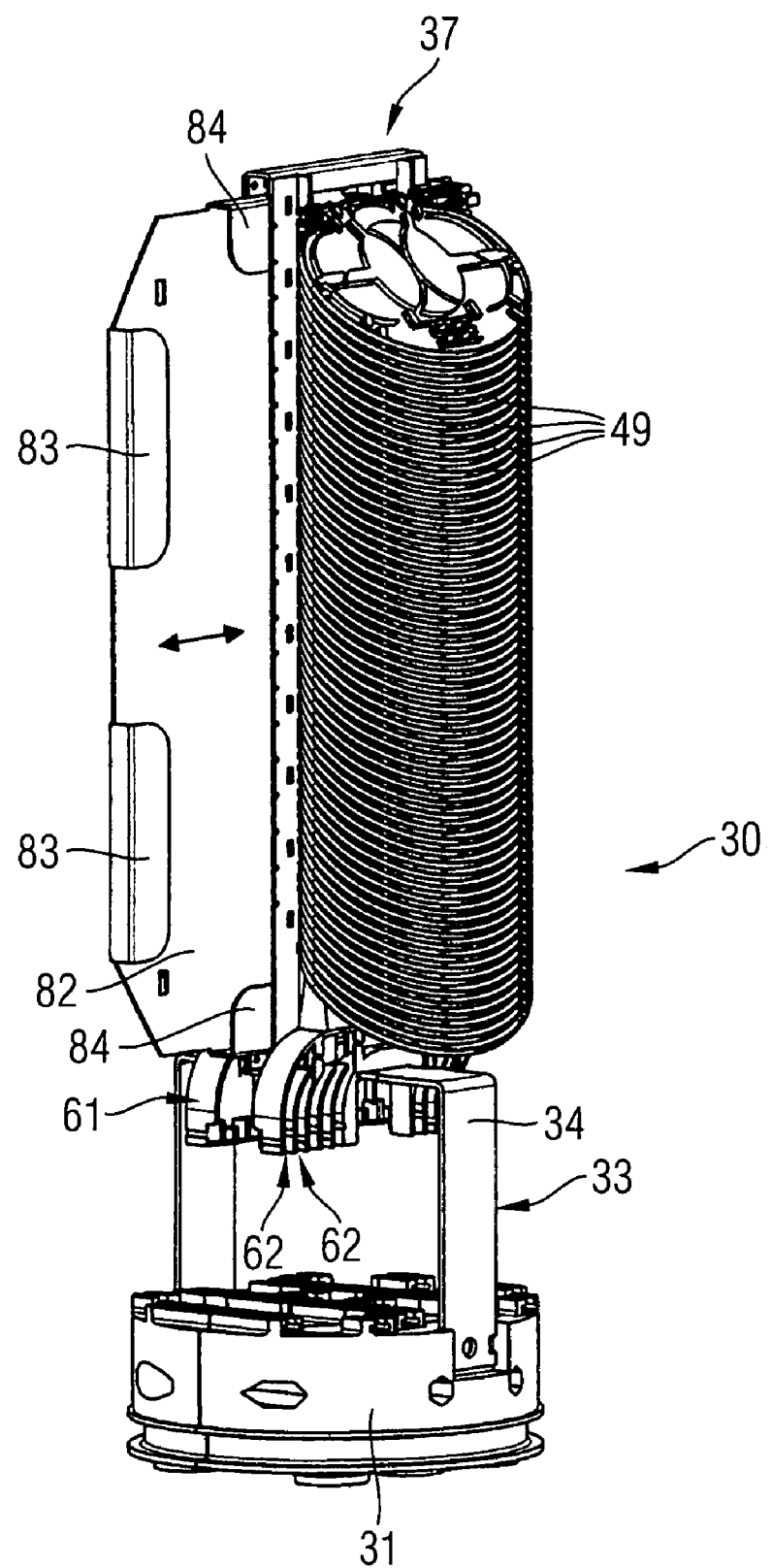
FIG. 21 shows the device according to the invention, formed as a hood-type sleeve, for the structured storage of spliced optical-fiber connections according to FIGS. 1 to 20 with a pulled-out drawer for the storage of uncut multifiber buffer tubes, in a perspective front view analogous to FIG. 1.
Figure 22:
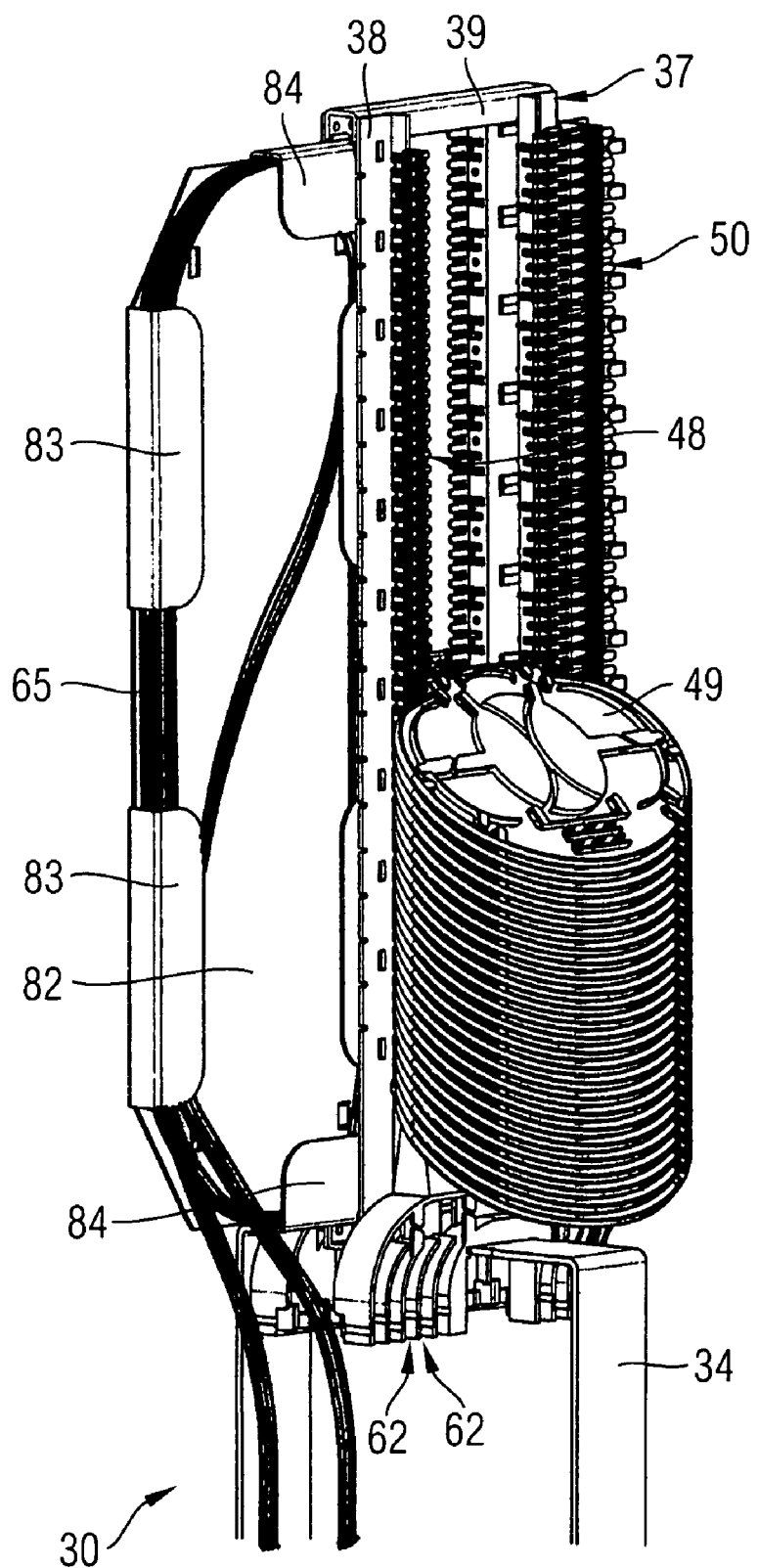
FIG. 22 shows the device according to FIG. 21 with an illustration of the guidance of the uncut multifiber buffer tubes within the pulled-out drawer, in a perspective front view.

According to a further aspect of the invention concerned here, a drawer 82 which can be pulled out from the frame 37 and is intended for the storage of uncut multifiber buffer tubes 65 is integrated in the frame 37 of the hood-type sleeve 30. The drawer 82 is integrated between the vertically running frame parts 38 of the frame 37 in the latter and can be pulled out from the frame 37 in a horizontal direction. The drawer 82 is thereby pulled out from the frame 37 to the vertically running narrow side 43 thereof which lies opposite from the vertically running narrow side 43 to which the fiber guiding elements 50 are fastened. Accordingly, the optical fibers 66 are guided in the region of the fiber guiding elements 50 to one side of the frame 37 or to one side of the splice case 49. To the opposite narrow side 43, the drawer 82 can be pulled out from the frame 37. FIG. 1 shows the drawer 82 in a position in which it is pushed into the frame 37, FIG. 21 shows it in a position in which it is pulled out from the frame 37. FIG. 22 shows uncut multifiber buffer tubes 65 stored in the drawer 82.

To be able to grip the drawer 82 for pulling it out from the frame 37, in the exemplary embodiment shown actuating grips 83 are provided on a vertically running side of the drawer 82. The actuating grips 83 serve at the same time for the secure guidance of the multifiber buffer tubes 65 within the drawer 82. In addition to the actuating grips 83, guides 84 are provided on horizontally running sides of the drawer 82. The guides 84 also serve for the secure storage of the multifiber buffer tubes 65 within the drawer 82.

In accordance with the first exemplary embodiment according to FIGS. 1 to 22 of the invention concerned here, a hood-type sleeve 30 is accordingly proposed, within which sleeve all the optical fibers 66 are guided to a side next to the stack of splice cases 49 once said fibers have been individually separated from the multifiber buffer tubes 65 in the region of the fixing device 61 by removal of the buffer tube jacket. The optical fibers 66 are accordingly guided vertically upward exclusively to one side of the stack of splice cases 49. Provided for this purpose on this one side are fiber guiding elements 50, which both in the region of the front side 40 and in the region of the rear side 41 of the frame 37 provide vertically running guiding channels 52, 53, which are respectively subdivided into an inner guiding channel compartment 56 and an outer guiding channel compartment 57. Furthermore, it is in keeping with the invention to guide the optical fibers 66 out of the outer guiding channel compartments 57 into curved guiding channels 60 in such a way that the optical fibers 66 are guided through cylindrical axial bodies 67 of the splice cases 49 and are therefore directed into the interior of the splice cases 49. The optical fibers 66 are prevented from jumping out from the cylindrical axial bodies 67, to be specific from a radial opening 68 of the axial bodies, by guiding webs 69, 70 integrated in the splice cases 49. Within the splice cases 49, the optical fibers 66 are guided in a circular manner. Also provided is a drawer 82 for the storage of uncut multifiber buffer tubes, which can be pulled out from the frame 37 to a side which is opposite from the side to which the fiber guiding elements 50 are fastened. The splice cases 59 can be fastened into the holders 48 independently of the fiber guiding elements 50. This produces a modular construction of the device according to the invention.

The above aspects of the design with respect to FIGS. 1 to 22 all relate to the hood-type sleeve 30 according to the first exemplary embodiment of the invention. A second exemplary embodiment of the invention is described below with reference to FIGS. 23 to 32. The second exemplary embodiment according to FIGS. 23 to 32 also relates to a hood-type sleeve 85. In the aspects concerning the basic structural design, the hood-type sleeve 85 of the second exemplary embodiment according to FIGS. 23 to 32 coincides with the hood-type sleeve 30 of the first exemplary embodiment according to FIGS. 1 to 22. To avoid unnecessary repetition, the same reference numerals are therefore used for the same subassemblies. Only the differences which differentiate the hood-type sleeve 85 according to the second exemplary embodiment as shown in FIGS. 23 to 32 from the hood-type sleeve 30 of the first exemplary embodiment as shown in FIGS. 1 to 22 are discussed below.

A first basic difference between the hood-type sleeve 85 according to the second exemplary embodiment of the invention and the hood-type sleeve 30 according to the first exemplary embodiment of the invention is that the drawer has been omitted in the case of the hood-type sleeve 85. In the case of the hood-type sleeve 85 according to the second exemplary embodiment of the invention, fiber guiding elements 50 in keeping with the invention extend to both vertically running narrow sides 43 of the frame 37. This can be seen in particular from FIGS. 23 and 24. It follows directly from this that guiding channels 52 and 53 are formed in the region of the two vertically running narrow sides 43. Each of these guiding channels 52 and 53 is in turn subdivided into guiding channel compartments, to be specific into inner guiding channel compartments 56 and outer guiding channel compartments 57. Laterally next to the two vertically running narrow sides 43, and consequently to both sides of the splice cases 49, there accordingly extend in each case four guiding channel compartments 56 and 57, respectively, positioned in a plane next to one another.

Figure 23:
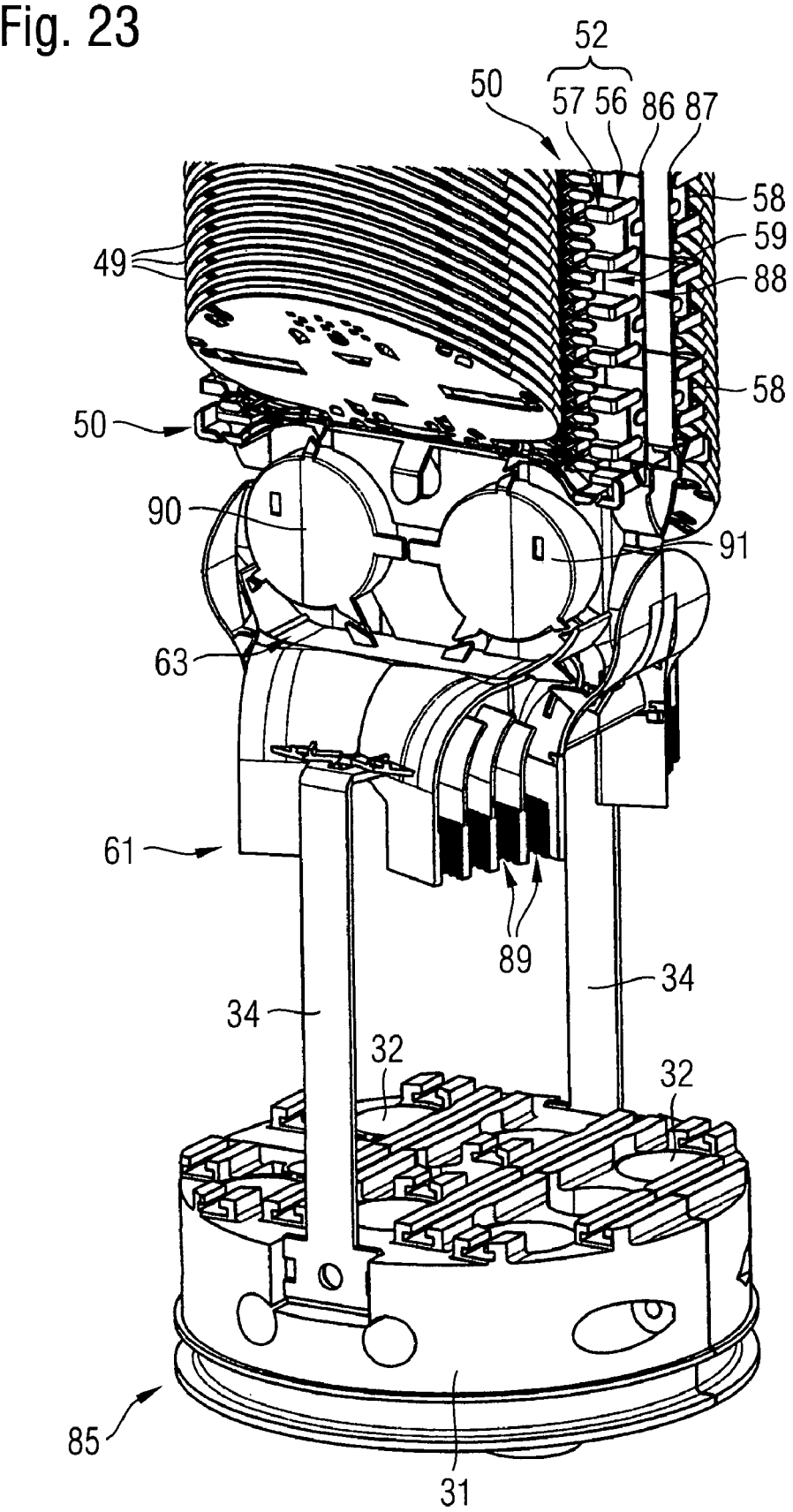
FIG. 23 shows a cutout from a device according to the invention, formed as a hood-type sleeve, for the structured storage or handling of spliced optical-fiber connections, without the covering hood, according to a second exemplary embodiment of the invention, in a perspective front view.
Figure 24:
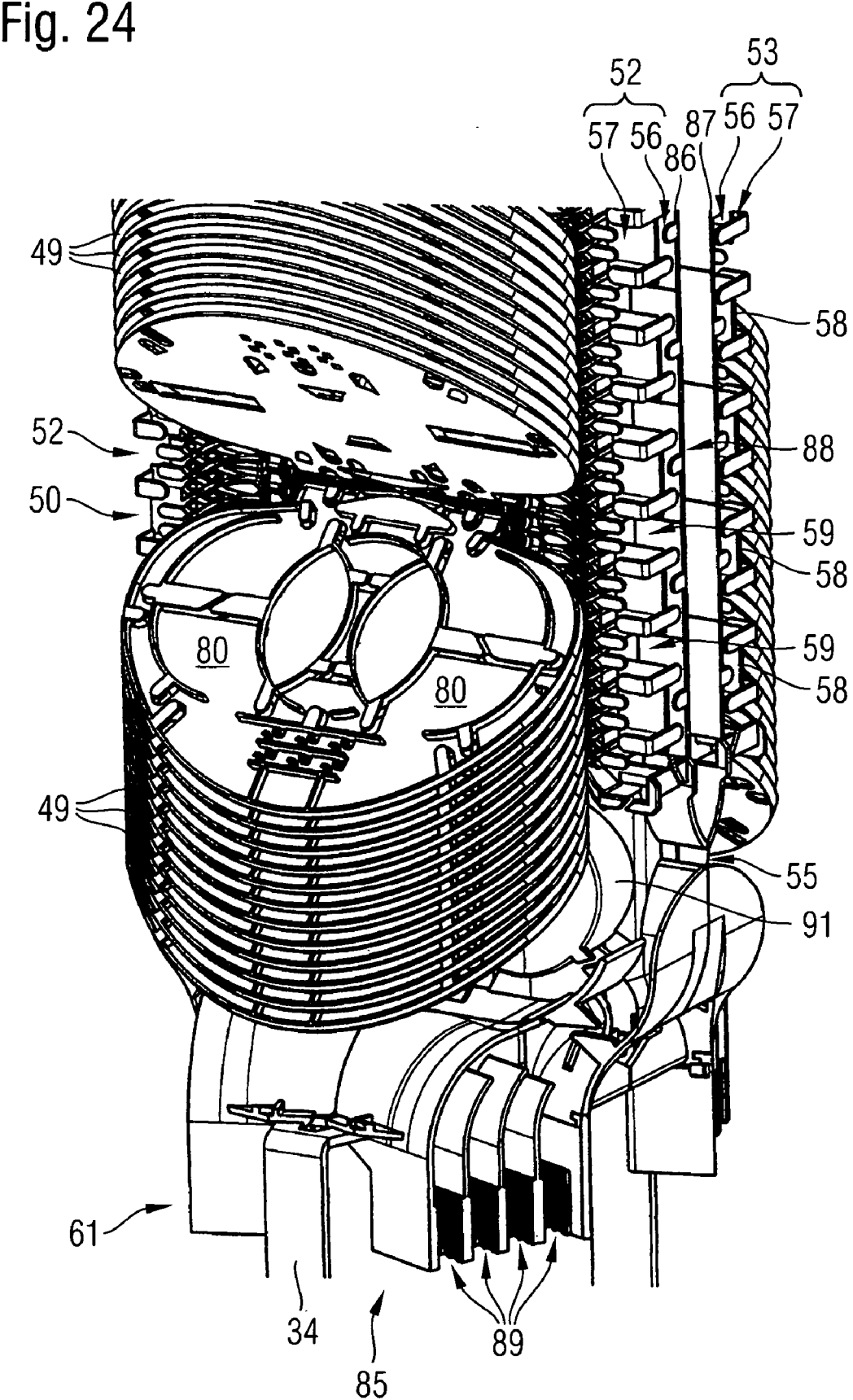
FIG. 24 shows a cutout from the device according to FIG. 23 with partly swung-down splice cases.
Figure 25:
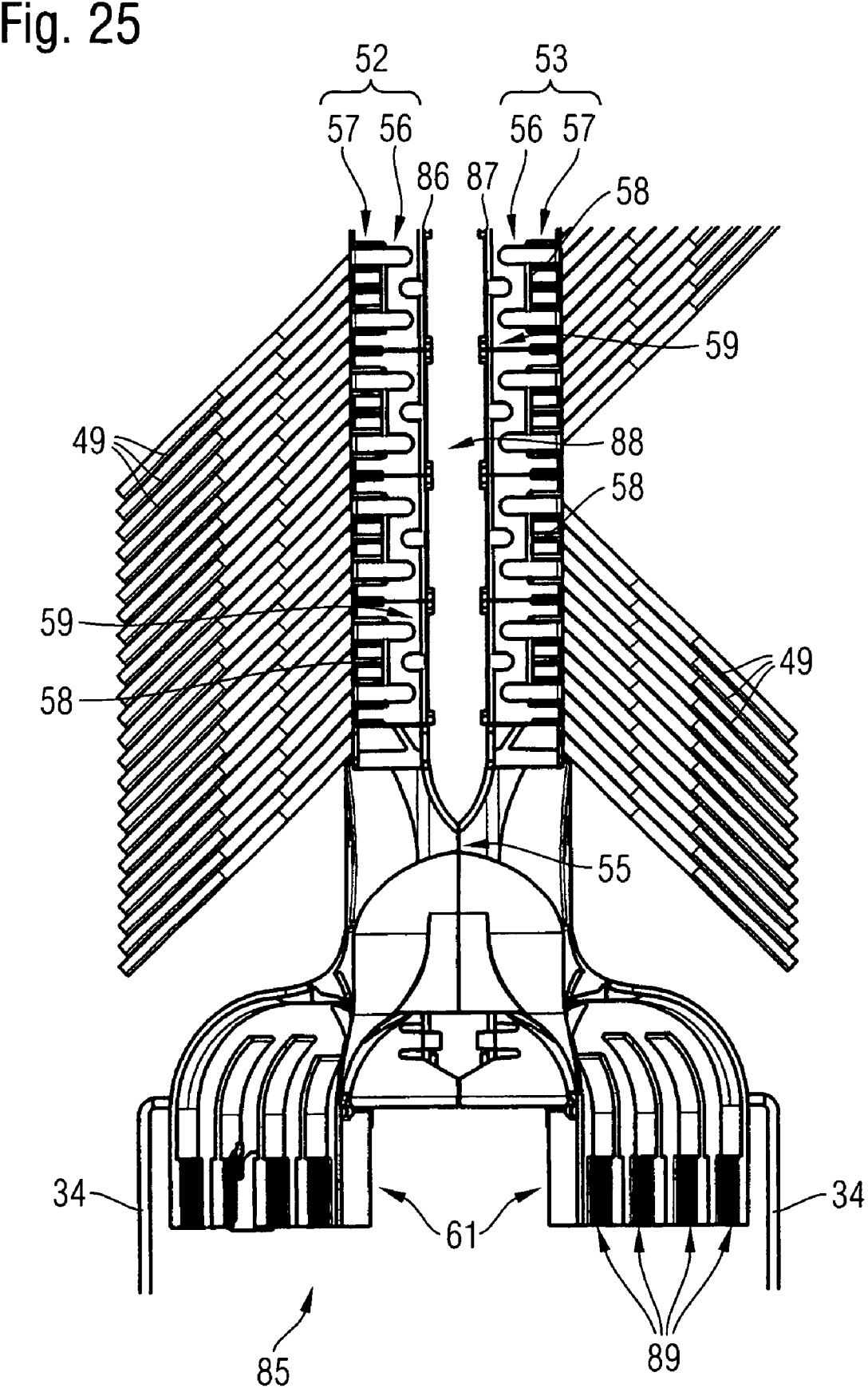
FIG. 25 shows a cutout from the device according to the invention, formed as a hood-type sleeve, for the structured storage of spliced optical-fiber connections according to FIGS. 23 to 24, in a side view.
Figure 26:
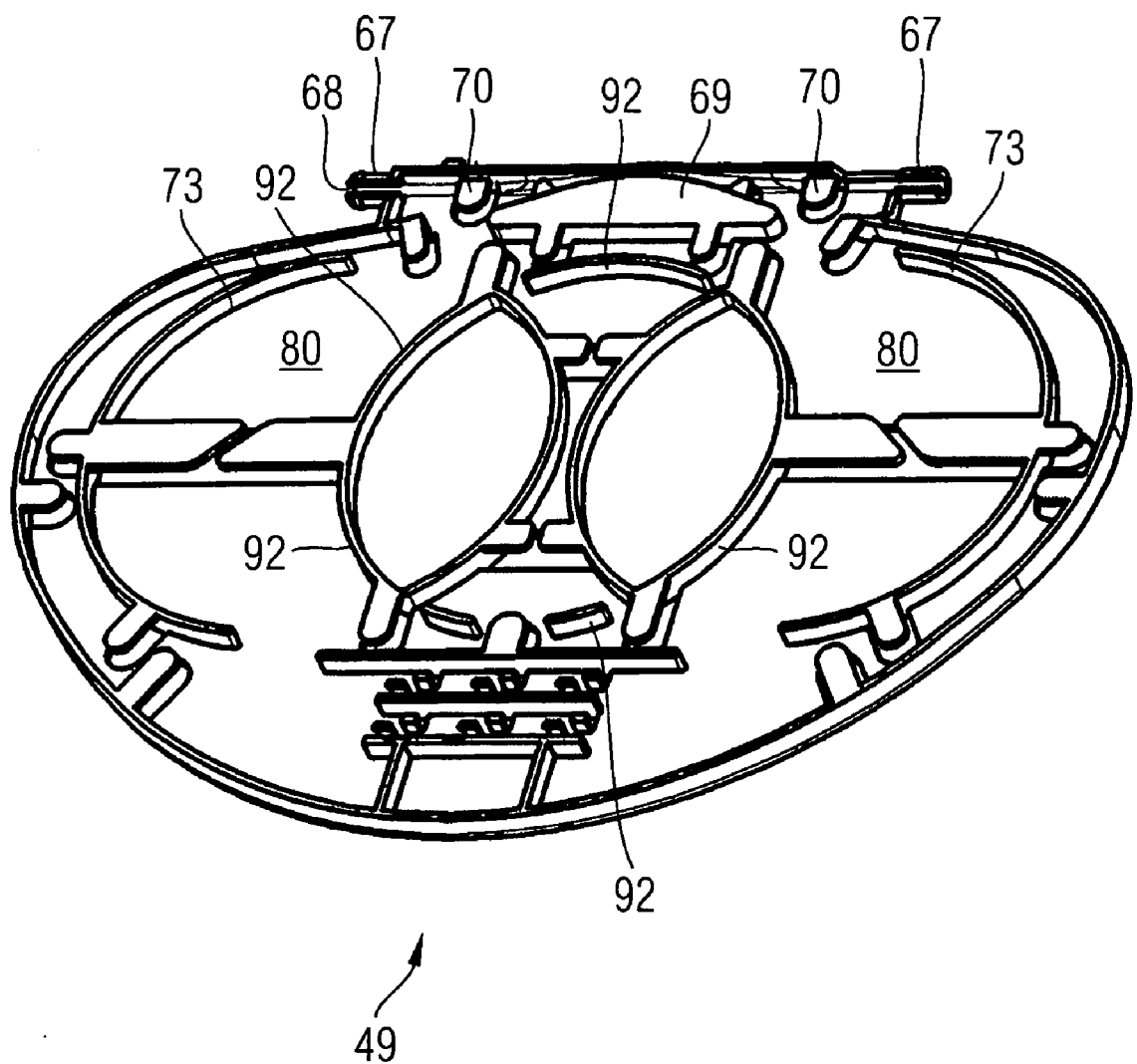
FIG. 26 shows a splice case of the device according to the invention, formed as a hood-type sleeve, for the structured storage of spliced optical-fiber connections according to FIGS. 23 to 25, in a perspective plan view.
Figure 27:
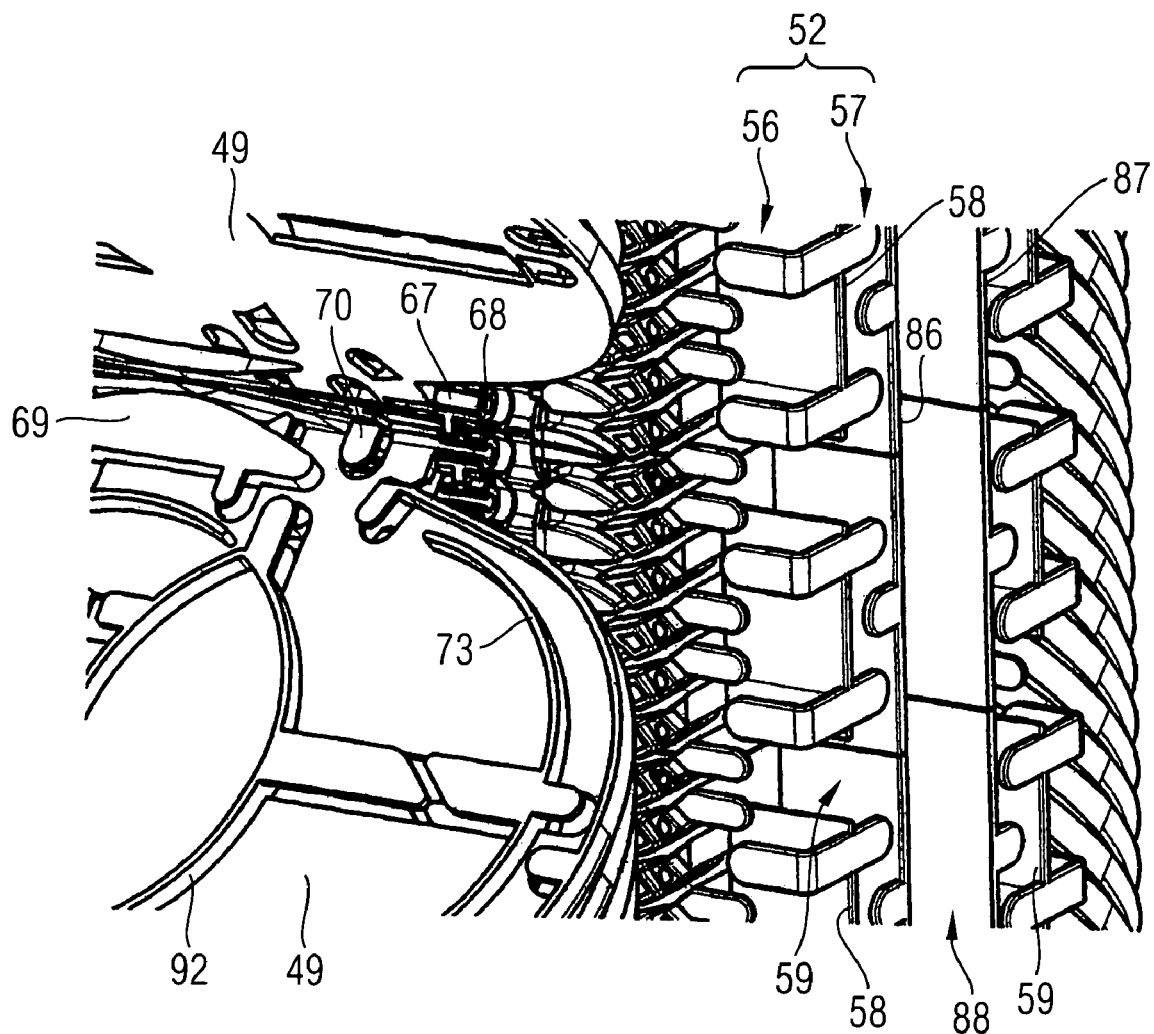
FIG. 27 shows an enlarged cutout from the detail of FIG. 24 in a perspective front view.
Figure 28:
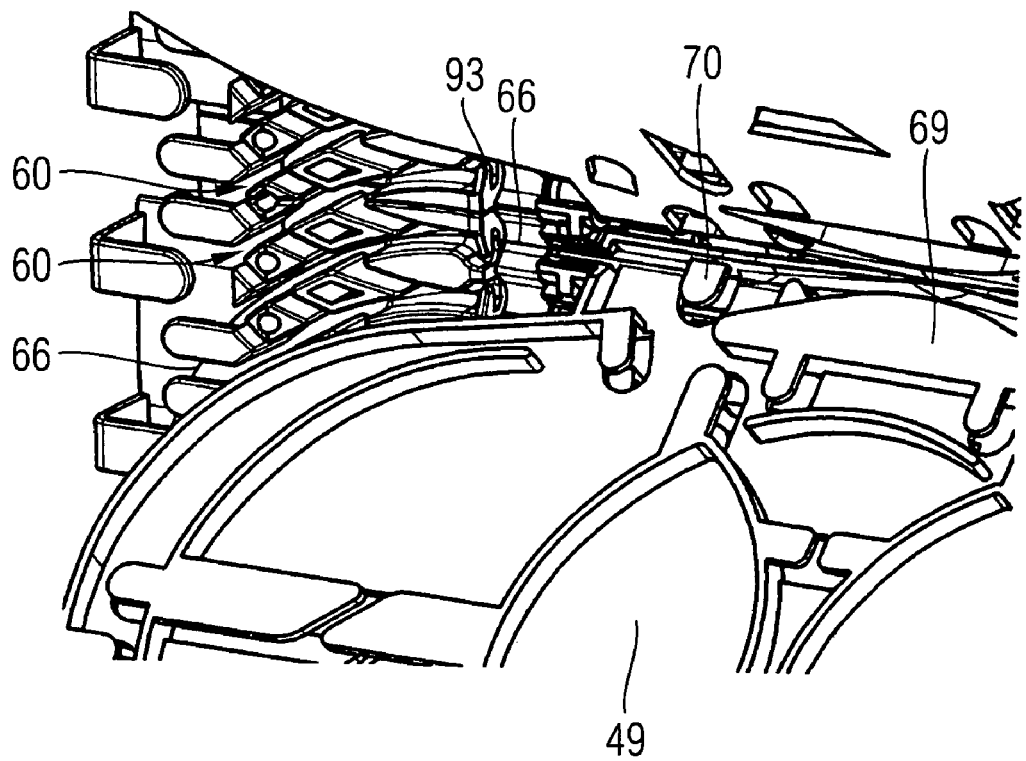
FIG. 28 shows another enlarged cutout from the detail of FIG. 24 in a perspective front view together with an optical fiber.
Figure 29:
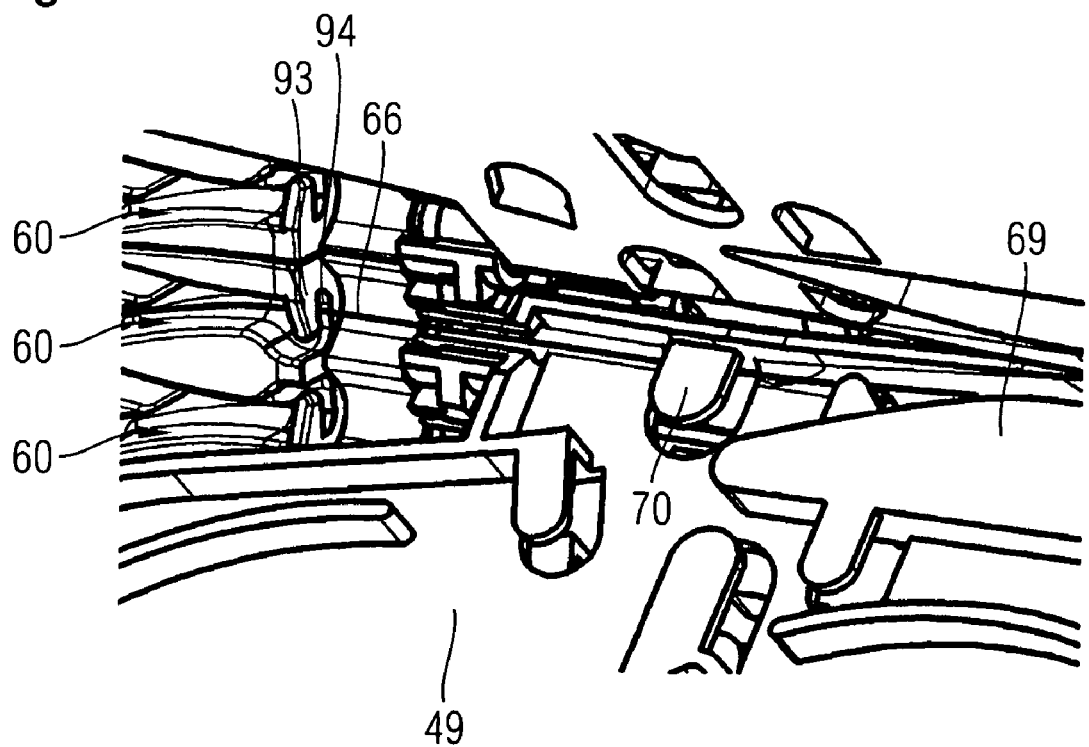
FIG. 29 shows the detail according to FIG. 28 in an enlarged representation.
Figure 30:
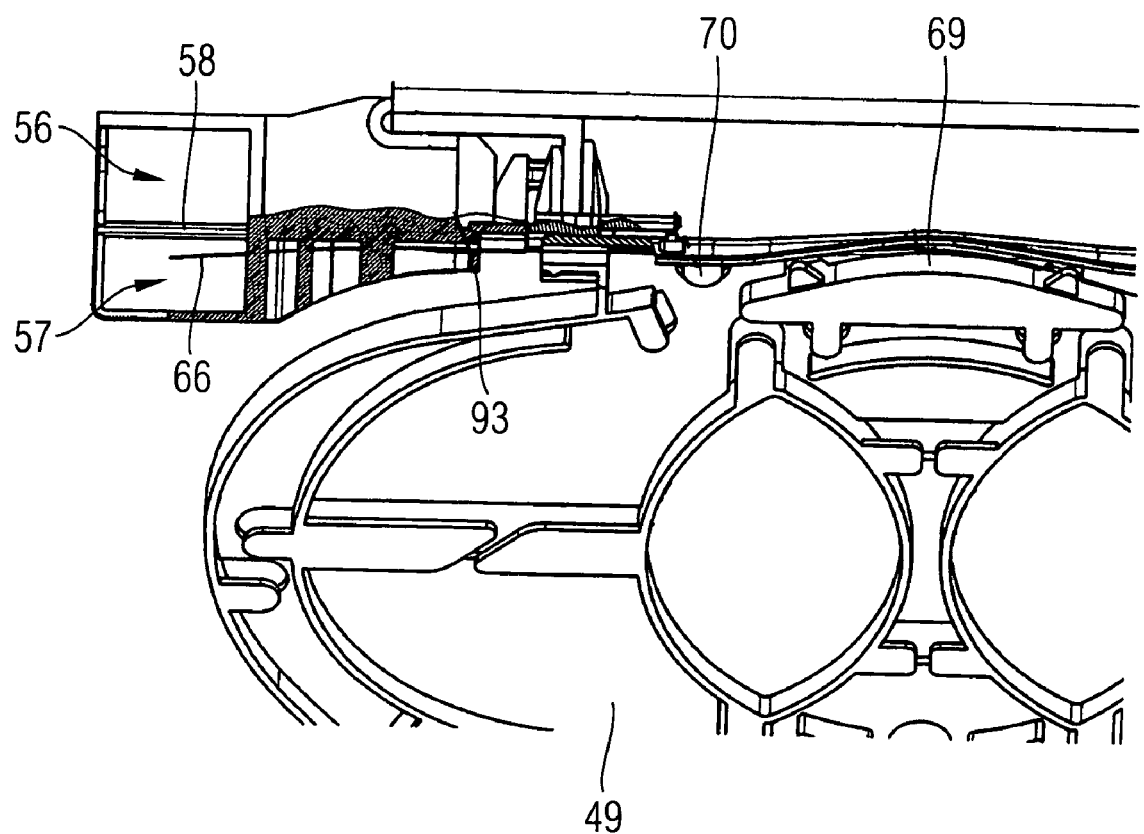
FIG. 30 shows an enlarged cutout from the detail of FIGS. 28 to 29 in a perspective plan view.

As revealed in particular by FIGS. 23 to 25, a second difference between the hood-type sleeve 85 according to the second exemplary embodiment of the invention and the hood-type sleeve 30 according to the first exemplary embodiment of the invention is that the guiding channels 52 and 53 running in the region of the two vertically running narrow sides 43 are not separated from one another merely by one vertically running separating wall, but rather by two vertically running separating walls 86 and 87, the two separating walls 86 and 87 being spaced apart from one another and accordingly bounding a receiving space 88. This receiving space 88 can best be seen in FIG. 25. Uncut multifiber buffer tubes can be inserted into the receiving space 88. The receiving space 88 of the hood-type sleeve 85 according to the second exemplary embodiment of the invention as shown in FIGS. 23 to 32 accordingly undertakes the function of the drawer 82 of the hood-type sleeve 30 according to the first exemplary embodiment of the invention as shown in FIGS. 1 to 22.

As likewise revealed by FIGS. 24 and 25, the separating walls 86 and 87, otherwise running parallel to one another and spaced apart from one another, touch in a lower portion to form the aperture 55. The aperture 55 serves in turn the purpose of deflecting optical fibers from the front side 40 into the region of the rear side 41 or from the region of the rear side 41 into the region of the front side 40.

A further difference between the two exemplary embodiments relates to the design of the directing device or fixing device 61 for the multifiber buffer tubes. This is revealed in particular by FIGS. 23 to 25. As a difference from the hood-type sleeve 30 according to the first exemplary embodiment of the invention, guiding channels or directing channels 89 formed by the directing device or fixing device 61 do not all lie in one plane in the case of the hood-type sleeve 85 of the second exemplary embodiment of the invention according to FIGS. 23 to 32. The directing channels 89 also do not all end and/or open out in the region of a vertically running narrow side 43, but half of the directing channels 89 open out in the region of a first vertically running narrow side 43 and the other half of the directing channels 89 open out in the region of the second vertically running narrow side 43. As already mentioned, this is so because, in the case of the hood-type sleeve 85 according to the second exemplary embodiment of the invention the optical fibers are guided upward laterally next to the splice cases 49 in the region of both vertically running narrow sides 43. To this extent, it is advantageous for this exemplary embodiment that the directing channels 89 also end in the region of the two vertically running narrow sides 43.

In order to guide optical fibers which run either in the region of the front side 40 or in the region of the rear side 41 from the guiding channels 52 or 53 in the region of a first vertically running narrow side 43 into the region of the guiding channels 52 or 53 of the second vertically running narrow side 43, in the case of the exemplary embodiment of FIGS. 23 to 32 two deflecting cylinders 90 and 91 are respectively provided in the region of the plate-shaped element 63, both in the region of the front side 40 and in the region of the rear side 41. The deflecting cylinders 90 and 91 can best be seen from FIG. 23. Optical fibers which are accordingly to be guided from one vertically running narrow side 43 into the region of the other vertically running narrow side 43 can accordingly be guided back and forth by means of the deflecting cylinders 90 and 91 in a simple and careful manner, while conforming to the permissible minimum bending radii. It should also be pointed out that the deflection from the front side 40 to the rear side 41 or from the rear side 41 to the front side 40 takes place via the apertures 55, which are arranged laterally next to the vertically running narrow sides 43 in the region of the guiding channels 52 and 53.

A further difference between the hood-type sleeve 30 according to the first exemplary embodiment of the invention and the hood-type sleeve 85 according to the second exemplary embodiment of the invention relates to the structural design of the splice cases 49. The splice cases 49 of the hood-type sleeve 85 according to the second exemplary embodiment of the invention are shown most clearly in FIGS. 24 and 26. The splice cases 49 of the hood-type sleeve 85 according to the second exemplary embodiment of the invention also allow circular guidance of the optical fibers in the form of three interlinked and overlapping circular guides, as has been explained in the case of the first exemplary embodiment in connection with FIG. 13. A difference between the splice cases can be seen, however, in the design or configuration of the guiding ribs. The splice case 49 of the second exemplary embodiment of the invention has in turn two outer semicircular and web-like guiding ribs 73, but the flat guiding ribs 74 have been omitted. Rather, web-like guiding ribs 92 are present in the central portion of the splice case 49 of the second exemplary embodiment. In a way similar to the web-like guiding ribs 73, the web-like guiding ribs 92 define in certain portions a segment of a circle. In the case of the splice cases 49 of the second exemplary embodiment of the invention, however, guiding channels between the guiding ribs 92 arranged in the central region of the splice case 49 have been omitted.

This is advantageous with regard to the guidance of the optical fibers. Furthermore, the web-like formation of the guiding ribs 92 in the central region of the splice case 49 produces a saving of material, and consequently a weight reduction.

Figure 31:
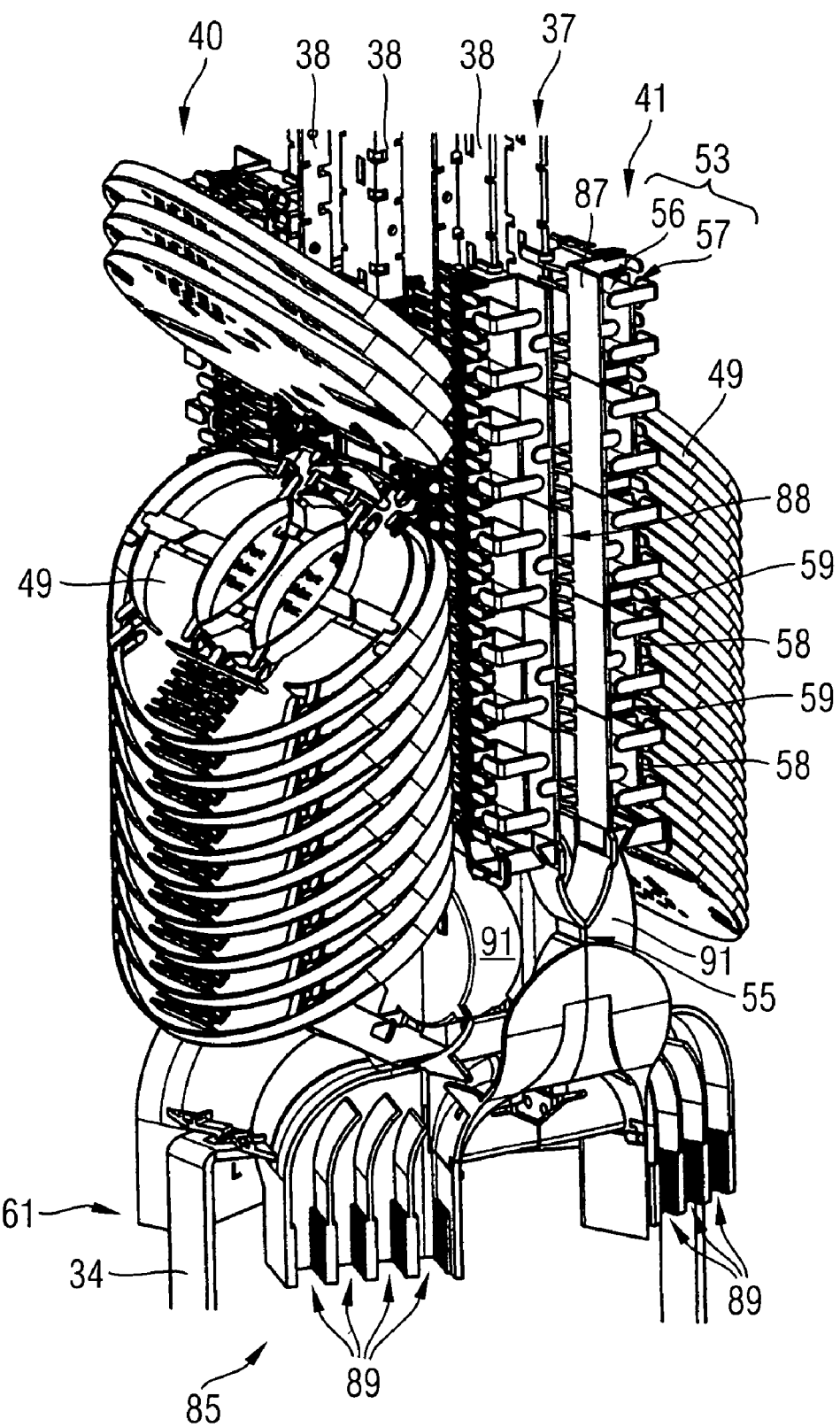
FIG. 31 shows a representation of the device according to the invention for the structured storage of spliced optical-fiber connections according to FIGS. 23 to 30 with splice cases of different thicknesses.

FIG. 31 shows a further difference, relating to the splice case, between the two exemplary embodiments. It can be seen in FIG. 31 that splice cases 49 of different thicknesses can be used. According to FIG. 31, the splice cases 49 in the region of the front side 40 are twice as thick as the splice cases 49 in the region of the rear side 41 of the hood-type sleeve 85. In the splice cases 49 of twice the thickness or height, a greater number of spliced connections can be stored. It is a special feature of the structural design principle of the invention concerned here that splice cases of different thicknesses or heights can be interchanged in a simple manner, without making any further structural design modifications to the sleeve. If splice cases 49 of twice the thickness or height are used, only every second holder 48 is used for the splice cases 49. Two holders 48 which lie opposite one another at the same height then in turn form a pivot axis for the splice case 49. The holders positioned directly above and beneath the holders 48 forming a pivot axis remain free when a splice case 49 of twice the height or thickness is used. Accordingly, no structural design modifications have to be made to the holders for the splice cases.

A further difference between the two exemplary embodiments of the invention concerned here relates to the securement of the optical fibers 66 placed into the cylindrical axial bodies 67 of the splice cases 49 to prevent them jumping out from the cylindrical axial bodies 67 during a pivoting movement of the splice cases 49. Thus coinciding with the first exemplary embodiment according to FIGS. 1 to 22, the guiding webs 69 and 70 are in turn integrated in the splice case 49 in the case of the second exemplary embodiment according to FIGS. 23 to 32. This can be seen most clearly in FIGS. 28 to 30. In the case of the second exemplary embodiment according to FIGS. 23 to 32, however, the guiding channels 52 and 53, and consequently the outer guiding channel compartments 57, are offset outward to form the receiving space 88, so that the function of the guiding web 72 described in the case of the first exemplary embodiment according to FIGS. 1 to 22 is no longer effective in the region of the outer guiding channel compartment 57. In order to compensate for this, in the case of the second exemplary embodiment according to FIGS. 23 to 32 guiding ribs 93 are provided in the region of the curved guiding channels 60, to be specific neighboring the holders 48 for the axial bodies 67 of the splice cases 49. The guiding ribs 93 can be seen most clearly in FIG. 29. The guiding ribs 93 protrude alternately in the upward and downward directions, the optical fibers 66 being guided in a groove-like recess 94 within the guiding ribs 93. Accordingly, if the splice case 49 is turned, the optical fiber 66 always remains within the recess 94 and accordingly always lies constantly against the guiding rib 93. Jumping out of the optical fiber 66 from the opening 68 inside the axial body 67 is thereby avoided.

Figure 32:
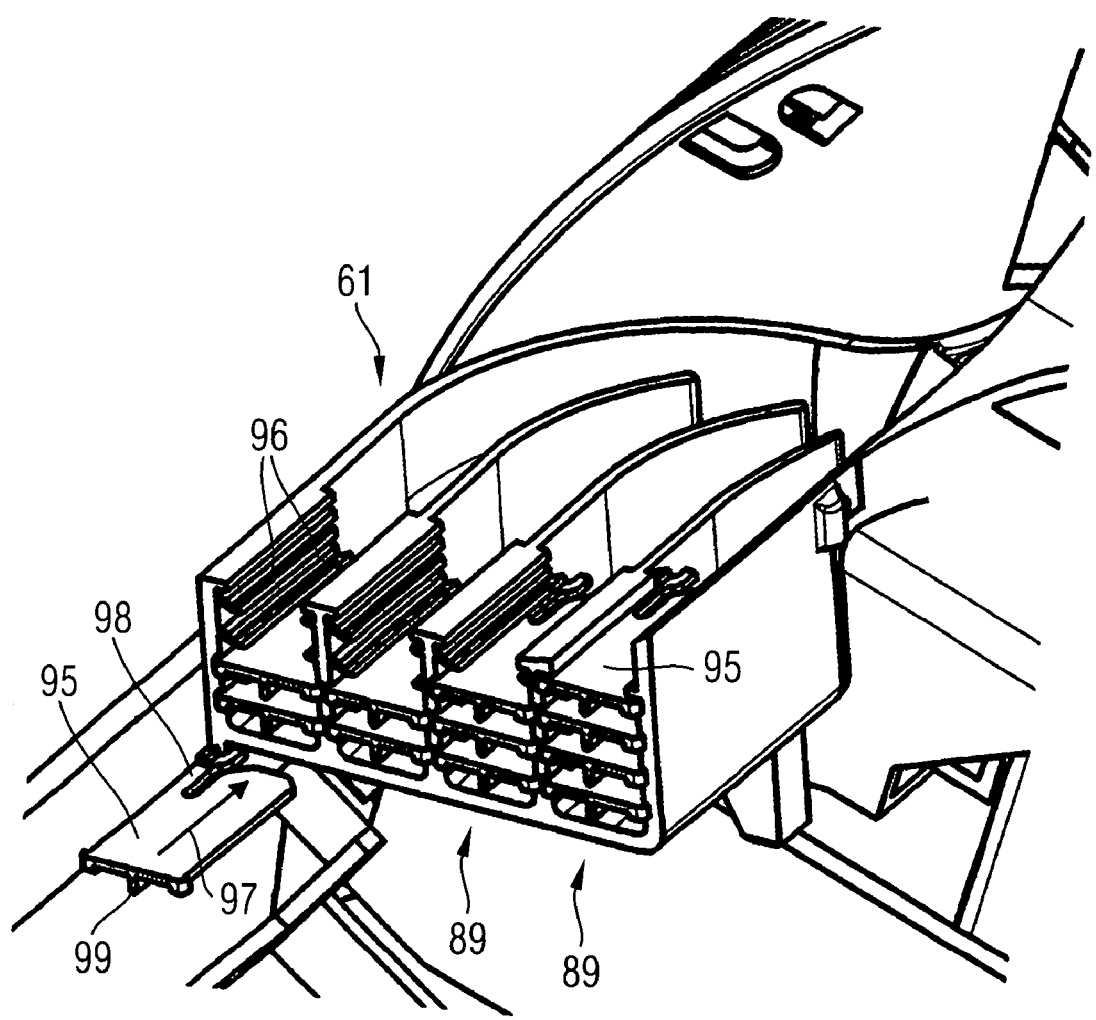
FIG. 32 shows a further detail of the device for the structured storage of spliced optical-fiber connections according to FIGS. 23 to 31 in the region of the buffer-tube guide.

FIG. 32 shows a further detail of the invention concerned here which can be used both in the case of the exemplary embodiment according to FIGS. 1 to 22 and in the case of the exemplary embodiment according to FIG. 23 et seq. FIG. 32 shows four guiding channels 89 lying next to one another in the region of the directing device or fixing device 61 for the multifiber buffer tubes. As shown in the detail according to FIG. 32 and as the difference in relation to the fastening of the multifiber buffer tubes by means of cable ties that was explained in connection with the first exemplary embodiment according to FIGS. 1 to 22, here the fixing of the multifiber buffer tubes in the region of the guiding channels 89 takes place by means of holding plates 95. As FIG. 32 reveals, guiding rails 96 into which the holding plates 95 can be pushed are provided in the region of the guiding channels 89. The pushing-in of the holding plates 95 into the guiding rails 96 takes place in the sense of the arrow 97. As FIG. 32 reveals, a slot-like clearance is provided in the holding plate 95. If the holding plate 95 is pushed into the corresponding guiding rails 96 in the direction of the arrow 97, a barb-like anchoring element 98, which is bounded by the slot or the clearance, is pressed inward, the anchoring element 98 snapping back again into its original position when the holding plate 95 has been pushed completely into the guiding rails 96, and therefore fixing the holding plate 95 in the guiding channels 89. According to the invention, one side of the holding plate 95 is smoothly formed, whereas a separating web 99 is provided on the opposite side of the holding plate 95. A holding plate 99 accordingly serves for fixing two multifiber buffer tubes in the guiding channels 89, a buffer tube being respectively arranged to each side of the separating web 99. If two new multifiber buffer tubes are to be fixed in the guiding channels 89 in the case of the arrangement shown in FIG. 32, the buffer tubes are first placed on the smooth side of an already inserted holding plate 95, and then a new holding plate 95 is pushed into the corresponding guiding rails 96. Furthermore, it should be noted that an axial displacement of the buffer tubes is possible in the case of the fixing of the same that is shown in FIG. 32.

The invention claimed is:

1. A device for storing and handling optical waveguides comprising a frame and a plurality of splice cases arranged one above the other on a front side and on a rear side of the frame and pivotably fastened to the frame, wherein fiber guiding elements for optical fibers are provided on at least one vertically running narrow side of the frame such that the optical fibers are guided laterally next to the splice cases in the region of the narrow side, wherein the fiber guiding elements generally extend in an outward direction relative to the frame.

2. The device as claimed in claim 1, wherein the fiber guiding elements are provided on exclusively one vertically running narrow side of the frame, and wherein the optical fibers are guided laterally next to the splice cases exclusively in the region of the one narrow side.

3. The device as claimed in claim 1, wherein the fiber guiding elements are provided on both vertically running narrow sides of the frame, and wherein the optical fibers are guided laterally next to the splice cases in the region of both narrow sides.

4. The device as claimed in claim 1, wherein the fiber guiding elements arranged in the region of the narrow side form at least two vertically running guiding channels for optical fibers, a first guiding channel being assigned to the front side of the frame and a second guiding channel being assigned to the rear side of the frame.

5. The device as claimed in claim 4, wherein the two guiding channels are spatially separated from one another by at least one vertically running separating wall, and wherein the separating wall has an aperture in a lower portion so that the optical fibers are diverted from the first guiding channel into the second guiding channel, and consequently from the front side of the frame to the rear side of the frame.

6. The device as claimed in claim 4, wherein each of the guiding channels is subdivided into two guiding channel compartments such that at least two vertically running guiding channel compartments extend in the region of the front side of the frame and in the region of the rear side of the frame.

7. The device as claimed in claim 6, wherein the two vertically running guiding channel compartments comprise inner guiding channel compartments, of which a first runs in the region of the front side of the frame and a second runs in the region of the rear side of the frame, separated from one another by a separating wall.

8. The device as claimed in claim 6, wherein the guiding channel compartments running in the region of the front side and in the region of the rear side of the frame are separated from each other by a plurality of separating webs spaced apart from one another, an aperture being formed between two neighboring separating webs such that the optical fibers in the region of the front side and in the region of the rear side of the frame can be diverted between the respective guiding channel compartments.

9. The device as claimed in claim 1, wherein the fiber guiding elements fastened to the narrow side form curved guiding channels such that individual optical fibers may be fed to the splice cases through the curved guiding channels.

10. A device for storing and handling optical waveguides comprising a frame, a plurality of splice cases arranged one above the other on a front side and on a rear side of the frame and pivotably fastened to the frame, and a drawer that is guided in the frame and can be pulled out in the horizontal direction from a first vertically running narrow side of the frame, the drawer being arranged in the pushed-in position between the splice cases arranged on the front side and the splice cases arranged on the rear side of the frame, the drawer configured for storing uncut multifiber buffer tubes of optical fibers.

11. The device as claimed in claim 10, wherein the drawer has on one vertically running side at least one actuating grip and has on horizontally running sides guides for the multifiber buffer tubes.

12. The device as claimed in claim 10, wherein one or more fiber guiding elements for optical fibers are provided on a second vertically running narrow side of the frame opposite the first narrow side such that the optical fibers are guided laterally next to the splice cases exclusively in the region of the second narrow side.

13. The device as claimed in claim 12, wherein the fiber guiding elements provided on the second narrow side form at least two vertically running guiding channels, a first guiding channel being assigned to the front side of the frame and a second guiding channel being assigned to the rear side of the frame.

14. A device for storing and handling optical waveguides comprising a frame, a plurality of splice cases arranged one above the other on a front side and on a rear side of the frame and pivotably fastened to the frame, and guiding channels arranged within the splice cases such that the optical fibers are guided within the splice cases in a circular manner, wherein the guiding channels are arranged such that at least three interlinked and overlapping circular guides are formed in each splice case, wherein the circular guides are aligned in relation to one another such that the circular guides merge tangentially with one another in a central portion of the splice cases.

* * * * *